(12) United States Patent
Sakakibara

(10) Patent No.: US 6,212,083 B1
(45) Date of Patent: Apr. 3, 2001

(54) SINGLE-PHASE RECTIFIER

(75) Inventor: kenichi Sakakibara, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 09/424,340

(22) PCT Filed: May 20, 1998

(86) PCT No.: PCT/JP98/02221
§ 371 Date: Nov. 22, 1999
§ 102(e) Date: Nov. 22, 1999

(87) PCT Pub. No.: WO98/53549
PCT Pub. Date: Nov. 26, 1998

(30) Foreign Application Priority Data

May 20, 1997 (JP) .................................................... 9-130076
Jul. 17, 1997 (JP) .................................................... 9-192834

(51) Int. Cl.$^7$ ...................................................... H02M 7/06
(52) U.S. Cl. ............................................... 363/126; 363/61
(58) Field of Search .................................. 363/125, 126, 363/127, 128, 61, 59, 60

(56) References Cited

U.S. PATENT DOCUMENTS

| | | | |
|---|---|---|---|
| 4,729,081 | * | 3/1988 | Nilssen ................................. 363/17 |
| 4,819,145 | * | 4/1989 | Maeba ................................... 363/63 |
| 5,572,415 | * | 11/1996 | Mohan ................................... 363/61 |
| 5,883,502 | * | 3/1999 | Spitaler ................................. 323/222 |
| 5,933,342 | * | 8/1999 | Callanan .............................. 363/126 |
| 5,982,649 | * | 11/1999 | Turner ................................... 363/89 |

FOREIGN PATENT DOCUMENTS

| 4-79769 | 3/1992 | (JP) . |
|---|---|---|
| 6-113548 | 4/1994 | (JP) . |

* cited by examiner

Primary Examiner—Adolf Deneke Berhane
(74) Attorney, Agent, or Firm—Smith, Gambrell & Russell, LLP.

(57) ABSTRACT

This single phase rectification apparatus connects a full wave rectification circuitry (3) to a single phase A.C. power source (1) through a reactor (2), connects a pair of smoothing diodes (5) which is connected in series to one another between the output terminals of the full wave rectification circuitry (3), connects a series connection circuitry of a pair of diodes (4) in parallel to the series connection circuitry (5) of the pair of the smoothing diodes, connects the center point of the pair of the diodes (4) and the center point of the pair of the smoothing diodes (5) to one another, and connects an A.C. capacitor (6) between one input terminal of the full wave rectification circuitry (3) and the center point of the pair of the smoothing diodes (5), so that decrease in size and in cost are realized for the single phase rectification apparatus in its entirety.

24 Claims, 34 Drawing Sheets model mode2 mode3 mode4

Time [ms]

mode5 mode6 mode1 mode3 mode1 mode2 mode3 mode4

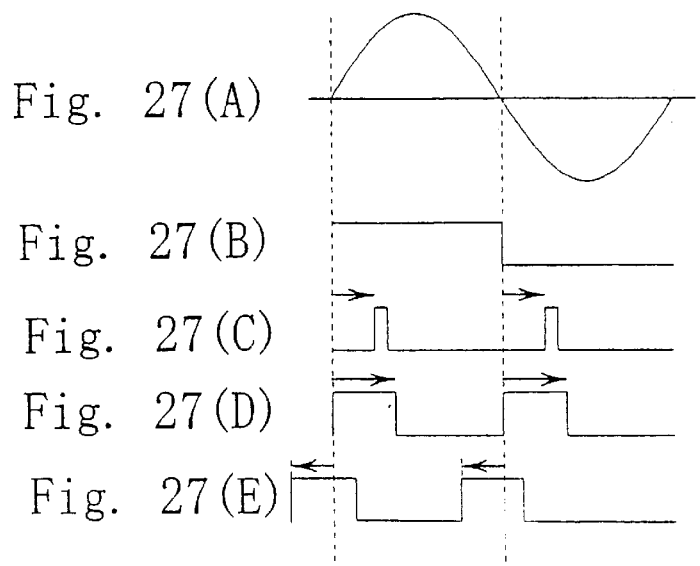
Fig. 27(A)
Fig. 27(B)
Fig. 27(C)
Fig. 27(D)
Fig. 27(E)
Fig. 28
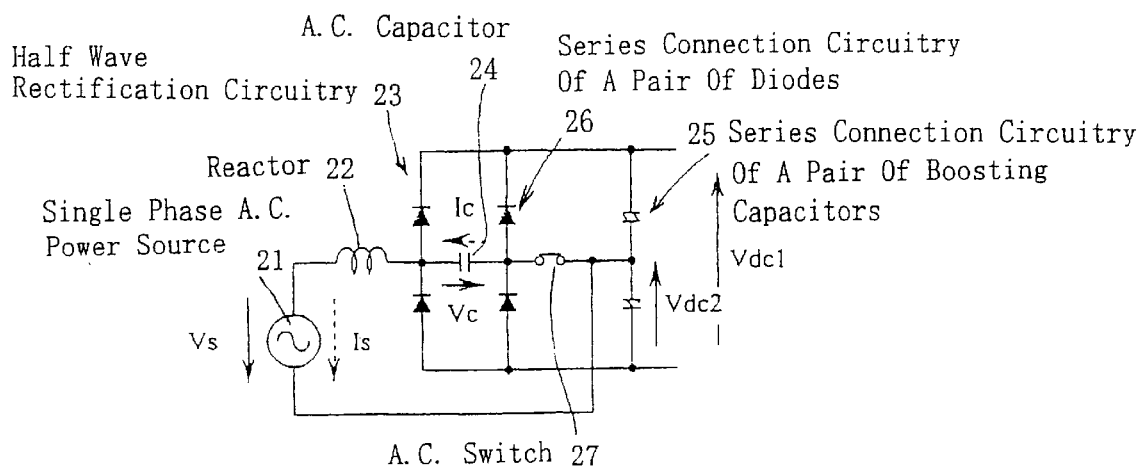

mode1 mode2 mode3 mode4 mode2 mode4 mode5 mode6

Load Power Signal Such As D.C. Voltage,
Input Current And The Like mode1 mode2 mode3 mode4 mode1 mode2 mode3 mode4

SINGLE-PHASE RECTIFIER

TECHNICAL FIELD

The present invention relates to a single phase rectification apparatus. More particularly, the present invention relates to a single phase rectification apparatus which has a fundamental arrangement in which a full wave rectification circuitry is connected to a single phase A.C. power source by interposing a reactor.

BACKGROUND ART

Rectifier loads are rapidly increased following employing of an inverter for air conditioning apparatus, lighting devices or the like in recent years. The rectifier loads have greater generation amount of higher harmonics in comparison to those of conventional A.C. devices. Therefore, voltage deformation is generated in a power system, disadvantages such as humming, combustion or the like of a phase advancing capacitor and a transformer. A higher harmonicas suppression guide line and an IEC standard are established for dealing with such disadvantages.

Under such condition, a circuitry of FIG. 20 in which a voltage doubler rectification circuitry illustrated in FIG. 15 is employed as a fundamental circuitry, is proposed as a system which enables improvement in power factor and decreasing in higher harmonics of a capacitor input type rectification circuitry (refer to "Higher Harmonics Decreasing Method of a Single Phase Diode Rectification Circuitry", Denki Gakkai Handoutai Denryoku Henkan Kenshi SPC-96-3, for example).

The circuitry of FIG. 20 is different from the circuitry of FIG. 15 in that a couple of A.C. capacitors connected in series to one another are employed instead of a pair of electrolytic capacitors connected in parallel to one another. That is, capacitances of the pair of serial capacitors are determined to be smaller, the capacitors being employed for obtaining a D.C. center point voltage. And, a current conduction angle is enlarged by pulsating the center point voltage following charging and discharging of the capacitors by the A.C. power source.

The voltage doubler rectification circuitry, illustrated in FIG. 15, operates by two modes (refer to mode 1 and mode 3) so that a voltage which is about double of a peak value of a power source wave (refer to FIG. 18 which represent voltage waveform of each section and FIG. 19 which represent current waveform of each section). The two modes alternately charge the pair of serial capacitors using half waves of the power source, the serial capacitors being connected in series to a D.C. section.

When the capacitances of the pair of serial capacitors connected to the D.C. section are determined to be small so as to discharge the corresponding serial capacitor within a time interval of a half cycle of the power source, the corresponding serial capacitor is fully discharged within the time interval of the half cycle of the power source, as is illustrated in FIG. 20. Therefore, the D.C. voltage becomes smaller than the peak value of the power source wave so that operation modes (refer to mode 2 in FIGS. 22, 25 and 26, and mode 4 in FIGS. 24, 25 and 26) for full wave rectification are generated. Further, the serial capacitors are started their charging from timings when the power source voltage is 0 so that the conduction angle in current is enlarged and the power factor is improved.

This circuitry is charged and discharged using the half waves of the power source voltage so that a voltage pulsating extent of the serial capacitors becomes $0 \pm Vdc1$. A.C. capacitors are suitable as the serial capacitors employed in the circuitry because of the limitation in ripple currents. But, the D.C. voltage of $Vdc1/2$ is overlapped, as is illustrated in FIG. 25, so that the disadvantage arises in that the voltage utilization factor becomes bad.

In other words, the capacitance of the serial capacitor has a small value which is about $1/10$ of that of the voltage doubler rectification circuitry, so that a ripple current flowing through the serial capacitor is great. Therefore, the application of a cheap electrolyte capacitor is difficult which is popularly employed in a D.C. circuitry. The reason is that the capacitance and the ripple current have a proportional relationship to one another. An A.C. capacitance having a great allowable current is employed, accordingly. But, enlargement in size and increase in cost are generated in an entire rectification circuitry, because a D.C. voltage which is half of an output voltage of a rectification circuitry is overlapped to the A.C. capacitor and consequently the A.C. capacitor should have a rated voltage which corresponds to an A.C. voltage which is to be applied.

Further, a system which has a voltage four times or three times rectification circuitry as a fundamental arrangement is proposed as a system which improves the power factor and decreases higher harmonics of the voltage doubler rectification circuitry (refer to "Higher Harmonics Decreasing Method of a Single Phase Diode Rectification Circuitry", Ken-Ichiro Fujiwara, Hiroshi Nomura, Denki Gakkai Handoutai Denryoku Henkan Kenshi SPC-96-3, and "Single Phase Diode Rectification Circuitry Having Small Higher Harmonics Current", Isao Takahashi, Kazutaka Hori, Dengakuron D, Vol. 115, No. 10, Heisei 7 nen, pp1215–1220). "Higher Harmonics Decreasing Method of a Single Phase Diode Rectification Circuitry" among them enlarges the conduction angle in current by determining the capacitance of the two serial capacitances for obtaining the D.C. center point voltage and by pulsating the center point voltage by charging and discharging due to the A.C. power source. Further, "Single Phase Diode Rectification Circuitry Having Small Higher Harmonics Current" is an improved example from the voltage three times rectification circuitry.

Each system performs charging and discharging using a capacitor in multiple stages so that enlargement in size and increase in cost in a device are caused by increase in a number of parts. Therefore, each system is difficult to be applied to a device in practice.

The present invention was made in view of the above problems.

It is an object of the present invention to offer a single phase rectification apparatus which enables decrease in size and decrease in cost in its entirety.

DISCLOSURE OF THE INVENTION

A single phase rectification apparatus connects a full wave rectification circuitry to a single phase A.C. power source through a reactor, connects a pair of smoothing capacitors between the output terminals of the full wave rectification circuitry, the smoothing capacitors being connected in series to one another, connects a pair of diodes connected in series to one another in parallel to the pair of smoothing capacitors, connects the central point of the pair of the diodes and the center point of the pair of smoothing capacitors through an A.C. switch which operates to shut off both central points when load is light, and connects an A.C. capacitor between the one input terminal of the full wave rectification circuitry and the center point of the pair of the smoothing capacitors.

A single phase rectification apparatus connects the center point of the pair of diodes and the center point of the pair of the smoothing capacitors to one another through an A.C. switch which is controlled its ignition angle using phase controlling.

A single phase rectification apparatus connects the center point of the pair of the diodes and the center point of the smoothing capacitors to one another through an A.C. switch which is made of a self arc extinguishing element for controlling a conduction angle.

A single phase rectification apparatus connects the center point of the pair of the diodes and the center point of the pair of the smoothing capacitors to one another through a serial connection circuitry of an inductor and an A.C. switch which is controlled its ignition angle using phase controlling.

A single phase rectification apparatus connects the center point of the pair of the diodes and the center point of the smoothing capacitors to one another through an A.C. switch which is made of a self arc extinguishing element for controlling a conduction phase.

A single phase rectification apparatus connects a parallel connection circuitry of a half wave rectification circuitry and a pair of boosting capacitors connected in series to one another to a single phase A.C. power source through a reactor, connects a pair of diodes in series to one another to the series connection circuitry of the pair of the boosting capacitors in parallel, connects the center point of the pair of the diodes and the center point of the pair of the boosting capacitors to one another through an A.C. switch which operates to shut off both central points when load is light, and connects an A.C. capacitor between an input terminal of the half wave rectification circuitry and the center point of the pair of the boosting capacitors.

A single phase rectification apparatus connects an A.C. switch between the center point of the boosting capacitors and the center point of the pair of the diodes, the A.C. switch being controlled its ignition angle using phase controlling.

A single phase rectification apparatus connects an A.C. switch between the center point of the boosting capacitors and the center point of the pair of the diodes, the A.C. switch being made of a self arc extinguishing element for controlling a conduction angle.

A single phase rectification apparatus connects a series connection circuitry of an A.C. switch and an inductor between the center point of the boosting capacitors and the center point of the pair of the diodes, the A.C. switch being controlled its ignition angle using phase controlling.

A single phase rectification apparatus connects an A.C. switch between the center point of the boosting capacitors and the center point of the pair of the diodes, the A.C. switch being made of a self arc extinguishing element for controlling a conduction phase.

A single phase rectification apparatus connects a full wave rectification circuitry to a single phase A.C. power source through a reactor, connects a series connection circuitry of a pair of smoothing capacitors between output terminals of the full wave rectification circuitry, connects a series connection circuitry of a pair of diodes in parallel to the series connection circuitry of the pair of the smoothing capacitors, connects an A.C. capacitor between the center point of the series connection circuitry of the pair of the diodes and one input terminal of the full wave rectification circuitry, and includes a switch for selectively carrying out full wave rectification operation and voltage doubler rectification operation.

A single phase rectification apparatus connects a parallel connection circuitry of a half wave rectification circuitry and a pair of smoothing capacitors connected in series to one another to a single phase A.C. power source through a reactor, connects a series connection circuitry of a pair of first diodes in parallel to the series connection circuitry of the pair of the smoothing capacitors, connects a series connection circuitry of a pair of second diodes in parallel to the half wave rectification circuitry, connects an A.C. capacitor between the center point of the pair of the second diodes and the center point of the pair of the first diodes, connects a first switch between the center point of the pair of the second diodes and the input terminal of the half wave rectification circuitry, connects a second switch between the center point of the pair of the smoothing capacitors and the center point of the first diodes, connects a terminal among the series connection circuitry of the single phase A.C. power source and the reactor which terminal is not connected to the input terminal of the half wave rectification circuitry, to the center point of the pair of the smoothing capacitors through a third switch which operates in linkage with the first switch, and connects the terminal to the center point of the pair of the second diodes through a fourth switch.

A single phase rectification apparatus connects a full wave rectification circuitry to an A.C. power source through a reactor, connects a series connection circuitry of a pair of smoothing capacitors between the output terminals of the full wave rectification circuitry, connects a series connection circuitry of a pair of diodes in parallel to the series connection circuitry of the pair of the smoothing capacitors, connects the center point of the pair of the diodes and the center point of the pair of the smoothing capacitors to one another through an A.C. capacitor, and connects an A.C. switch between one input terminal of the full wave rectification circuitry and the center point of the pair of the smoothing diodes, which A.C. switch operates a shut off operation condition when load is light.

A single phase rectification apparatus connects the one input terminal of the full wave rectification circuitry and the center point of the pair of the smoothing capacitors to one another through an A.C. switch which is controlled its ignition angle by phase controlling.

A single phase rectification circuitry connects the one input terminal of the full wave rectification circuitry and the center point of the pair of the smoothing capacitors to one another through an A.C. switch which is made of a self arc extinguishing element for controlling a conduction angle.

A single phase rectification apparatus connects the one input terminal of the full wave rectification circuitry and the center point of the pair of the smoothing capacitors to one another through a series connection circuitry of an inductor and an A.C. switch which is controlled its ignition angle using phase controlling.

A single phase rectification apparatus connects the one input terminal of the full wave rectification circuitry and the center point of the pair of the smoothing capacitors to one another through an A.C. switch which is made of a self arc extinguishing element for controlling a conduction phase.

A single phase rectification apparatus connects a parallel connection circuitry of a half wave rectification circuitry and a pair of boosting capacitors connected in series to one another to a single phase A.C. power source through a reactor, connects a series connection circuitry of a pair of diodes in parallel to the series connection circuitry of the pair of the boosting capacitors, connects the center point of the pair of the diodes and the center point of the pair of the boosting capacitors to one another through an A.C.

capacitor, and connects an A.C. switch between the input terminal of the half wave rectification circuitry and the center point of the pair of the boosting capacitors which A.C. switch operates in a shut off operation condition when load is light.

A single phase rectification apparatus connects an A.C. switch between the input terminal of the half wave rectification circuitry and the center point of the pair of the boosting capacitors which A.C. switch is controlled its ignition angle using phase controlling.

A single phase rectification apparatus connects an A.C. switch between the input terminal of the half wave rectification circuitry and the center point of the pair of the boosting capacitors which A.C. switch is made of self arc extinguishing element for controlling a conduction angle.

A single phase rectification apparatus connects a series connection circuitry of an A.C. switch and an inductor between the input terminal of the half wave rectification circuitry and the center point of the pair of the boosting capacitors which A.C. switch is controlled its ignition phase using phase controlling.

A single phase rectification apparatus connects an A.C. switch between the input terminal of the half wave rectification circuitry and the center point of the pair of the boosting capacitors which A.C. switch is made of self arc extinguishing element for controlling a conduction phase.

A single phase rectification apparatus connects a full wave rectification circuitry to a single phase A.C. power source through a reactor, connects a series connection circuitry of a pair of smoothing capacitors between the output terminals of the full wave rectification circuitry, connects a series connection circuitry of a pair of diodes in parallel to the series connection circuitry of the pair of the smoothing capacitors, connects an A.C. capacitor between the center point of the series connection circuitry of the pair of the diodes and the center point of the series connection circuitry of the pair of the smoothing capacitors, and includes a switch for selectively carrying full wave rectification operation and voltage doubler rectification operation.

A single phase rectification apparatus connects a parallel connection circuitry of a half wave rectification circuitry and a pair of smoothing capacitors connected in series to one another to a single phase A.C. power source through a reactor, connects a series connection circuitry of a pair of first diodes connected in series to one another in parallel to the series connection circuitry of the pair of the smoothing capacitors, connects a series connection circuitry of a pair of second diodes in parallel to the half wave rectification circuitry, connects a second switch between the center point of the pair of the second diodes and the center point of the pair of the first diodes, connects a first switch between the center point of the pair of the second diodes and the input terminal of the half wave rectification circuitry, connects an A.C. capacitor between the center point of the pair of the smoothing capacitors and the center point of the pair of the first diodes, connects a terminal among the series connection circuitry of the single phase A.C. power source and the reactor which terminal is on a side which is not connected to the input terminal of the half wave rectification circuitry, to the center point of the pair of the smoothing capacitors through a third switch which operates in linkage with the first switch, and connects the terminal to the center point of the pair of the second diodes through a fourth switch.

When the single phase rectification apparatus is employed, the apparatus connects a full wave rectification circuitry to a single phase A.C. power source through a reactor, connects a pair of smoothing capacitors between the output terminals of the full wave rectification circuitry, the smoothing capacitors being connected in series to one another, connects a pair of diodes connected in series to one another in parallel to the pair of smoothing capacitors, connects the central point of the pair of the diodes and the center point of the pair of smoothing capacitors through an A.C. switch which operates to shut off both central points when load is light, and connects an A.C. capacitor between the one input terminal of the full wave rectification circuitry and the center point of the pair of the smoothing capacitors. Therefore, withstand voltages of all capacitors can be determined to be half of those of capacitors in conventional rectification apparatus illustrated in FIGS. 15 and 20, because the A.C. capacitor is connected between the D.C. center point and the one A.C. power source terminal which D.C. center point is obtained by the series connection circuitry of the pair of the smoothing capacitors. A number of the A.C. capacitors can be decreased to half number in comparison with the conventional rectification circuitry illustrated in FIG. 20. The series connection circuitry can be made with electrolyte capacitors instead of A.C. capacitors. As a result, decrease in size and in cost for the single phase rectification apparatus in its entirety are realized. Further, an over voltage in the D.C. section is prevented from occurrence and the rated voltage of the A.C. switch can be determined to be a half of that of the conventional rectification apparatus, because the one input terminal of the full wave rectification circuitry and the center point of the pair of the smoothing capacitors are connected to one another through the A.C. switch which operates in shut off condition when load is light.

When the single phase rectification apparatus is employed, the apparatus connects the center point of the pair of diodes and the center point of the pair of the smoothing capacitors to one another through an A.C. switch which is controlled its ignition angle using phase controlling. Therefore, higher harmonics and a D.C. voltage can be controlled and the operations and effects similar to those described herein can be realized.

When the single phase rectification apparatus according to claim 3 is employed, the apparatus connects the center point of the pair of the diodes and the center point of the smoothing capacitors to one another through an A.C. switch which is made of a self arc extinguishing element for controlling a conduction angle. Therefore, higher harmonics and a D.C. voltage can be controlled and the operations and effects similar to those described herein can be realized.

When the single phase rectification apparatus is employed, the apparatus connects the center point of the pair of the diodes and the center point of the pair of the smoothing capacitors to one another through a serial connection circuitry of an inductor and an A.C. switch which is controlled its ignition angle using phase controlling. Therefore, higher harmonics and a D.C. voltage can be controlled, the A.C. switch can securely be performed its shut off condition even when a load current is great, and the operations and effects similar to those described herein can be realized.

When the single phase rectification apparatus is employed, the apparatus connects the center point of the pair of the diodes and the center point of the smoothing capacitors to one another through an A.C. switch which is made of a self arc extinguishing element for controlling a conduction phase. Therefore, higher harmonics and a D.C. voltage can be controlled and the operations and effects similar to those described herein can be realized.

When the single phase rectification apparatus is employed, the apparatus connects a parallel connection circuitry of a half wave rectification circuitry and a pair of boosting capacitors connected in series to one another to a single phase A.C. power source through a reactor, connects a pair of diodes in series to one another to the series connection circuitry of the pair of the boosting capacitors in parallel, connects the center point of the pair of the diodes and the center point of the pair of the boosting capacitors to one another through an A.C. switch which operates to shut off both central points when load is light, and connects an A.C. capacitor between an input terminal of the half wave rectification circuitry and the center point of the pair of the boosting capacitors. Therefore, voltage doubler rectification operation can be realized by the pair of the boosting capacitors. And, decrease in higher harmonics can be realized by determining the capacitance of the pair of the boosting capacitors to be equal to that of boosting capacitors of conventional voltage doubler rectification circuitry. The current conduction width can be enlarged and the power factor can be improved by supplying the advancing current by the A.C. capacitor during current non-conduction interval of a conventional voltage doubler rectification circuitry. Further, complexation in arrangement can be prevented from occurrence and decrease in size and in cost of a device are realized because the apparatus is sufficiently arranged by adding only one A.C. capacitor to a fundamental circuitry for voltage doubler rectification. Decrease in power factor due to the advancing current can be prevented from occurrence and the rated voltage of the A.C. switch can be determined to be half of that of a conventional A.C. switch, because the A.C. switch is connected between the center point of the pair of the boosting capacitors and the center point of the pair of the diodes which A.C. switch operates in shut off condition when load is light.

When the single phase rectification apparatus is employed, the apparatus connects an A.C. switch between the center point of the boosting capacitors and the center point of the pair of the diodes, the A.C. switch being controlled its ignition angle using phase controlling. Therefore, higher harmonics and a D.C. voltage can be controlled and the operations and effects similar to those described herein can be realized.

When the single phase rectification apparatus is employed, the apparatus connects an A.C. switch between the center point of the boosting capacitors and the center point of the pair of the diodes, the A.C. switch being made of a self arc extinguishing element for controlling a conduction angle. Therefore, higher harmonics and a D.C. voltage can be controlled and the operations and effects similar to those described herein can be realized.

When the single phase rectification apparatus is employed, the apparatus connects a series connection circuitry of an A.C. switch and an inductor between the center point of the boosting capacitors and the center point of the pair of the diodes, the A.C. switch being controlled its ignition angle using phase controlling. Therefore, higher harmonics and a D.C. voltage can be controlled, the A.C. switch can securely be performed its shut off condition even when a load current is great, and the operations and effects similar to those described herein can be realized.

When the single phase rectification apparatus is employed, the apparatus connects an A.C. switch between the center point of the boosting capacitors and the center point of the pair of the diodes, the A.C. switch being made of a self arc extinguishing element for controlling a conduction phase. Therefore, higher harmonics and a D.C. voltage can be controlled and the operations and effects similar to those described herein can be realized.

When the single phase rectification apparatus according to claim 11 is employed, the apparatus connects a full wave rectification circuitry to a single phase A.C. power source through a reactor, connects a series connection circuitry of a pair of smoothing capacitors between output terminals of the full wave rectification circuitry, connects a series connection circuitry of a pair of diodes in parallel to the series connection circuitry of the pair of the smoothing capacitors, connects an A.C. capacitor between the center point of the series connection circuitry of the pair of the diodes and one input terminal of the full wave rectification circuitry, and includes a switch for selectively carrying out full wave rectification operation and voltage doubler rectification operation. Therefore, the voltage doubler rectification operation and the full wave rectification operation can be selected by operating the switch. As a result, the D.C. voltages equal to one another despite the voltages of the single phase A.C. power sources can be supplied by performing the voltage doubler rectification operation when the single phase A.C. power source has 100V and by performing the full wave rectification operation when the single phase A.C. power source has 200V. In other words, the apparatus can cope with the single phase A.C. power sources having voltages which are different from one another. Of course, decrease in higher harmonics and improvement in power factor are realized, similarly to those described herein, when the voltage doubler rectification operation is performed.

When the single phase rectification apparatus is employed, the apparatus connects a parallel connection circuitry of a half wave rectification circuitry and a pair of smoothing capacitors connected in series to one another to a single phase A.C. power source through a reactor, connects a series connection circuitry of a pair of first diodes in parallel to the series connection circuitry of the pair of the smoothing capacitors, connects a series connection circuitry of a pair of second diodes in parallel to the half wave rectification circuitry, connects an A.C. capacitor between the center point of the pair of the second diodes and the center point of the pair of the first diodes, connects a first switch between the center point of the pair of the second diodes and the input terminal of the half wave rectification circuitry, connects a second switch between the center point of the pair of the smoothing capacitors and the center point of the first diodes, connects a terminal among the series connection circuitry of the single phase A.C. power source and the reactor which terminal is not connected to the input terminal of the half wave rectification circuitry, to the center point of the pair of the smoothing capacitors through a third switch which operates in linkage with the first switch, and connects the terminal to the center point of the pair of the second diodes through a fourth switch. Therefore, the voltage doubler rectification operation and the full wave rectification operation can be selected by operating the first switch, the second switch and the fourth switch. As a result, the D.C. voltages equal to one another despite the voltages of the single phase A.C. power sources can be supplied by performing the voltage doubler rectification operation when the single phase A.C. power source has 100V and by performing the full wave rectification operation when the single phase A.C. power source has 200V. In other words, the apparatus can cope with the single phase A.C. power sources having voltages which are different from one another. Of course, decrease in higher harmonics and improvement in power factor are realized, similarly to those described herein, when the voltage doubler rectification operation is performed.

When the single phase rectification apparatus is employed, the apparatus connects a full wave rectification circuitry to an A.C. power source through a reactor, connects a series connection circuitry of a pair of smoothing capacitors between the output terminals of the full wave rectification circuitry, connects a series connection circuitry of a pair of diodes in parallel to the series connection circuitry of the pair of the smoothing capacitors, connects the center point of the pair of the diodes and the center point of the pair of the smoothing capacitors to one another through an A.C. capacitor, and connects an A.C. switch between one input terminal of the full wave rectification circuitry and the center point of the pair of the smoothing diodes, which A.C. switch operates a shut off operation condition when load is light. Therefore, withstand voltages of all capacitors can be determined to be half of those of capacitors in conventional rectification apparatus illustrated in FIGS. 15 and 20, because the A.C. capacitor is connected between the D.C. center point and the one A.C. power source terminal which D.C. center point is obtained by the series connection circuitry of the pair of the smoothing capacitors. A number of the A.C. capacitors can be decreased to half number in comparison with the conventional rectification circuitry illustrated in FIG. 20. The series connection circuitry can be made with electrolyte capacitors instead of A.C. capacitors. As a result, decrease in size and in cost for the single phase rectification apparatus in its entirety are realized. Further, an over voltage in the D.C. section is prevented from occurrence and short current flowing through the A.C. switch can be prevented from occurrence, because the center point of the pair of the diodes and the center point of the pair of the smoothing capacitors are connected to one another through the A.C. switch which operates in shut off condition when load is light.

When the single phase rectification apparatus is employed, the apparatus connects the one input terminal of the full wave rectification circuitry and the center point of the pair of the smoothing capacitors to one another through an A.C. switch which is controlled its ignition angle by phase controlling. Therefore, higher harmonics and a D.C. voltage can be controlled and the operations and effects similar to those described herein can be realized.

When the single phase rectification circuitry is employed, the apparatus connects the one input terminal of the full wave rectification circuitry and the center point of the pair of the smoothing capacitors to one another through an A.C. switch which is made of a self arc extinguishing element for controlling a conduction angle. Therefore, higher harmonics and a D.C. voltage can be controlled and the operations and effects similar to those of claim 13 can be realized.

When the single phase rectification apparatus is employed, the apparatus connects the one input terminal of the full wave rectification circuitry and the center point of the pair of the smoothing capacitors to one another through a series connection circuitry of an inductor and an A.C. switch which is controlled its ignition angle using phase controlling. Therefore, higher harmonics and a D.C. voltage can be controlled, the A.C. switch can securely be performed its shut off condition even when a load current is great, and the operations and effects similar to those described herein can be realized.

When the single phase rectification apparatus is employed, the apparatus connects the one input terminal of the full wave rectification circuitry and the center point of the pair of the smoothing capacitors to one another through an A.C. switch which is made of a self arc extinguishing element for controlling a conduction phase. Therefore, higher harmonics and a D.C. voltage can be controlled and the operations and effects similar to those described herein can be realized.

FIGS. 27 are diagrams useful in understanding timings of a control signal for the A.C. switch which timings correspond to the power source waveform {refer to FIG. 27(A)}. FIG. 27(B) represents the control signal described herein. FIG. 27(C) represents the control signal described herein. FIG. 27(D) represents the control signal described herein. And, FIG. 27(E) represents the control signal described herein.

When the single phase rectification apparatus is employed, the apparatus connects a parallel connection circuitry of a half wave rectification circuitry and a pair of boosting capacitors connected in series to one another to a single phase A.C. power source through a reactor, connects a series connection circuitry of a pair of diodes in parallel to the series connection circuitry of the pair of the boosting capacitors, connects the center point of the pair of the diodes and the center point of the pair of the boosting capacitors to one another through an A.C. capacitor, and connects an A.C. switch between the input terminal of the half wave rectification circuitry and the center point of the pair of the boosting capacitors which A.C. switch operates in a shut off operation condition when load is light. Therefore, voltage doubler rectification operation can be realized by the pair of the boosting capacitors. And, decrease in higher harmonics can be realized by determining the capacitance of the pair of the boosting capacitors to be equal to that of boosting capacitors of conventional voltage doubler rectification circuitry. The current conduction width can be enlarged and the power factor can be improved by supplying the advancing current by the A.C. capacitor during current non-conduction interval of a conventional voltage doubler rectification circuitry. Further, complexation in arrangement can be prevented from occurrence and decrease in size and in cost of a device are realized because the apparatus is sufficiently arranged by adding only one A.C. capacitor to a fundamental circuitry for voltage doubler rectification. Decrease in power factor due to the advancing current can be prevented from occurrence and the short current flowing through the A.C. switch can be prevented from occurrence, because the A.C. switch is connected between the center point of the pair of the boosting capacitors and the center point of the pair of the diodes which A.C. switch operates in shut off condition when load is light.

When the single phase rectification apparatus is employed, the apparatus connects an A.C. switch between the input terminal of the half wave rectification circuitry and the center point of the pair of the boosting capacitors which A.C. switch is controlled its ignition angle using phase controlling. Therefore, higher harmonics and a D.C. voltage can be controlled and the operations and effects similar to those described herein can be realized.

When the single phase rectification apparatus is employed, the apparatus connects an A.C. switch between the input terminal of the half wave rectification circuitry and the center point of the pair of the boosting capacitors which A.C. switch is made of self arc extinguishing element for controlling a conduction angle. Therefore, higher harmonics and a D.C. voltage can be controlled and the operations and effects similar to those described herein can be realized.

When the single phase rectification apparatus is employed, the apparatus connects a series connection circuitry of an A.C. switch and an inductor between the input terminal of the half wave rectification circuitry and the center point of the pair of the boosting capacitors which A.C. switch is controlled its ignition phase using phase controlling. Therefore, higher harmonics and a D.C. voltage can be controlled, the A.C. switch can securely be performed its shut off condition even when a load current is great, and the operations and effects similar to those described herein can be realized.

When the single phase rectification apparatus is employed, the apparatus connects an A.C. switch between the input terminal of the half wave rectification circuitry and the center point of the pair of the boosting capacitors which A.C. switch is made of self arc extinguishing element for controlling a conduction phase. Therefore, higher harmonics and a D.C. voltage can be controlled and the operations and effects similar to those described herein can be realized.

When the single phase rectification apparatus is employed, the apparatus connects a full wave rectification circuitry to a single phase A.C. power source through a reactor, connects a series connection circuitry of a pair of smoothing capacitors between the output terminals of the full wave rectification circuitry, connects a series connection circuitry of a pair of diodes in parallel to the series connection circuitry of the pair of the smoothing capacitors, connects an A.C. capacitor between the center point of the series connection circuitry of the pair of the diodes and the center point of the series connection circuitry of the pair of the smoothing capacitors, and includes a switch for selectively carrying full wave rectification operation and voltage doubler rectification operation. Therefore, the voltage doubler rectification operation and the full wave rectification operation can be selected by operating the switch. As a result, the D.C. voltages equal to one another despite the voltages of the single phase A.C. power sources can be supplied by performing the voltage doubler rectification operation when the single phase A.C. power source has 100V and by performing the full wave rectification operation when the single phase A.C. power source has 200V. In other words, the apparatus can cope with the single phase A.C. power sources having voltages which are different from one another. Of course, decrease in higher harmonics and improvement in power factor are realized, similarly to those described herein, when the voltage doubler rectification operation is performed.

When the single phase rectification apparatus is employed, the apparatus connects a parallel connection circuitry of a half wave rectification circuitry and a pair of smoothing capacitors connected in series to one another to a single phase A.C. power source through a reactor, connects a series connection circuitry of a pair of first diodes connected in series to one another in parallel to the series connection circuitry of the pair of the smoothing capacitors, connects a series connection circuitry of a pair of second diodes in parallel to the half wave rectification circuitry, connects a second switch between the center point of the pair of the second diodes and the center point of the pair of the first diodes, connects a first switch between the center point of the pair of the second diodes and the input terminal of the half wave rectification circuitry, connects an A.C. capacitor between the center point of the pair of the smoothing capacitors and the center point of the pair of the first diodes, connects a terminal among the series connection circuitry of the single phase A.C. power source and the reactor which terminal is on a side which is not connected to the input terminal of the half wave rectification circuitry, to the center point of the pair of the smoothing capacitors through a third switch which operates in linkage with the first switch, and connects the terminal to the center point of the pair of the second diodes through a fourth switch. Therefore, the voltage doubler rectification operation and the full wave rectification operation can be selected by operating the first switch, the second switch and the fourth switch. As a result, the D.C. voltages equal to one another despite the voltages of the single phase A.C. power sources can be supplied by performing the voltage doubler rectification operation when the single phase A.C. power source has 100V and by performing the full wave rectification operation when the single phase A.C. power source has 200V. In other words, the apparatus can cope with the single phase A.C. power sources having voltages which are different from one another. Of course, decrease in higher harmonics and improvement in power factor are realized, similarly to those described herein, when the voltage doubler rectification operation is performed.

BRIEF DESCRIPTION OF THE DRAWINGS

FIGS. 27(A)–(E) are diagrams useful in understanding the timings of the control signal for controlling the A.C. switch in correspondence with the power source waveform;

FIG. 28 is an electric diagram of a single phase rectification circuitry of a further embodiment according to the present invention;

BEST MODE FOR CARRYING OUT THE INVENTION

Hereinafter, referring to the attached drawings, we explain single phase rectification apparatus of embodiments according to the present invention.

Figure 1:
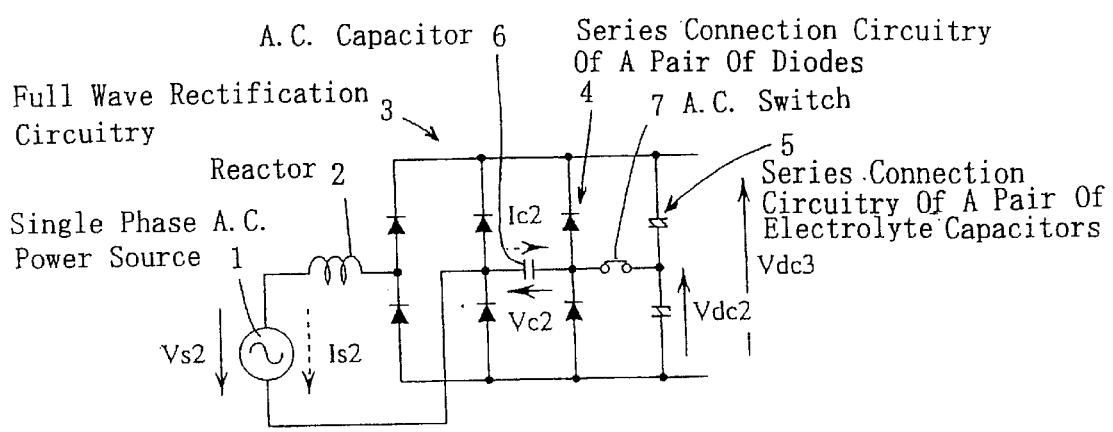
FIG. 1 is an electric diagram illustrating a single phase rectification apparatus of an embodiment according to the present invention.
Figure 2:
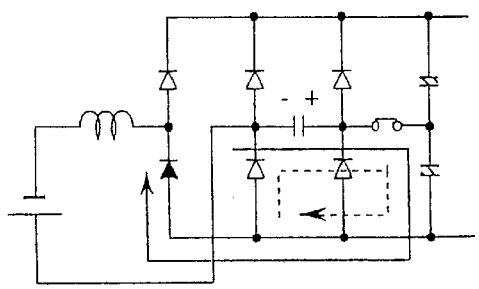
FIG. 2 is an electric diagram useful in understanding a first operation mode (mode 1) of the single phase rectification apparatus which is illustrated in FIG. 1.

FIG. 1 is an electric diagram illustrating a single phase rectification apparatus of an embodiment according to the present invention.

In this single phase rectification apparatus, a reactor 2 is connected to a single phase A.C. power source 1, and a full wave rectification circuitry 3 is connected to the serial circuitry of the single phase A.C. power source 1 and the reactor 2. And, a series connection circuitry 4 of a pair of diodes and a series connection circuitry 5 of a pair of electrolyte capacitors are connected in parallel to one another between the output terminals of the full wave rectification circuitry 3. The center point of the series connection circuitry 4 of the pair of the diodes and the center point of the series connection circuitry 5 of the pair of the electrolyte capacitors are connected to one another through an A.C. switch 7. An A.C. capacitor 6 is connected between the center point of the series connection circuitry 5 of the pair of the electrolyte capacitors and one input terminal (in FIG. 1, an input terminal to which the reactor 2 is not connected) of the full wave rectification circuitry. It is sufficient that the A.C. capacitor 6 is connected between one input terminal of the full wave rectification circuitry 3 and the center point of the series connection circuitry 5 of the pair of the electrolyte capacitors. For example, the A.C. capacitor 6 may be connected between the center point of the series connection circuitry 4 of the pair of the diodes and one input terminal of the full wave rectification circuitry 3. Also, it is possible that the center point of the series connection circuitry 4 of the pair of the diodes and one input terminal of the full wave rectification circuitry 3 are connected to one another directly, and that the A.C. capacitor 6 is connected between the center point of the series connection circuitry 5 of the pair of the electrolyte capacitors and the center point of the series connection circuitry 4 of the pair of the diodes. When the connection position of the A.C. capacitor 6 is one of the above positions, operations and effects are realized which are similar to one another. Further, the series connection circuitry 4 of the pair of the diodes is used for discharging the accumulated charge of the A.C. capacitor 6 when the A.C. switch is shut off and for clamping the application voltage of the A.C. switch 7 by $-Vdc3/2$ and $+Vdc3/2$.

Figure 6:
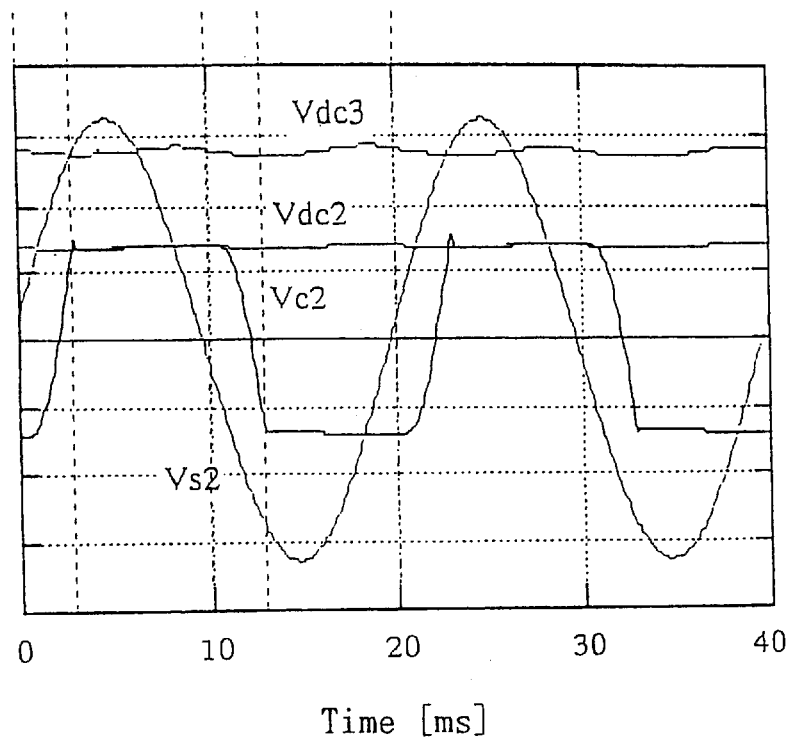
FIG. 6 is a diagram illustrating voltage waveforms of each section of the single phase rectification apparatus which is illustrated in FIG. 1.
Figure 7:
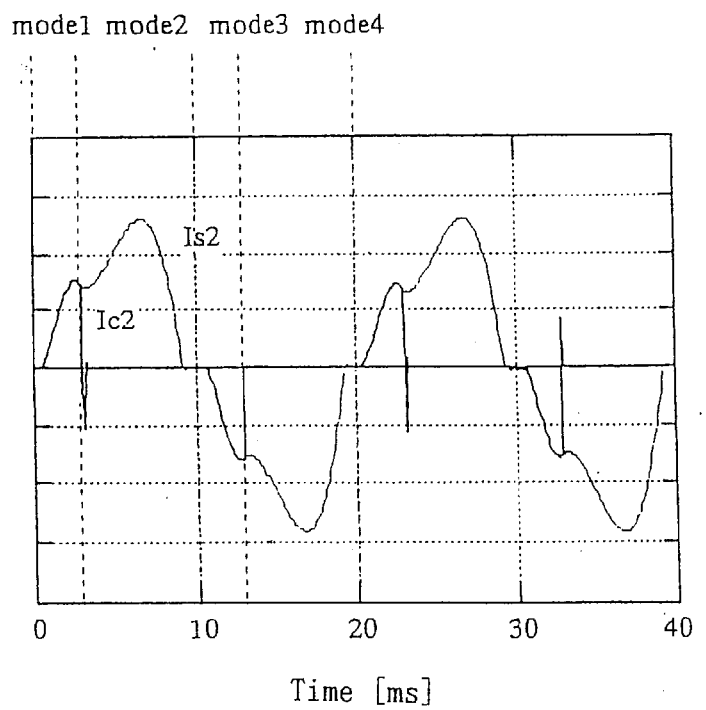
FIG. 7 is a diagram illustrating current waveforms of each section of the single phase rectification apparatus which is illustrated in FIG. 1.
Figure 15:
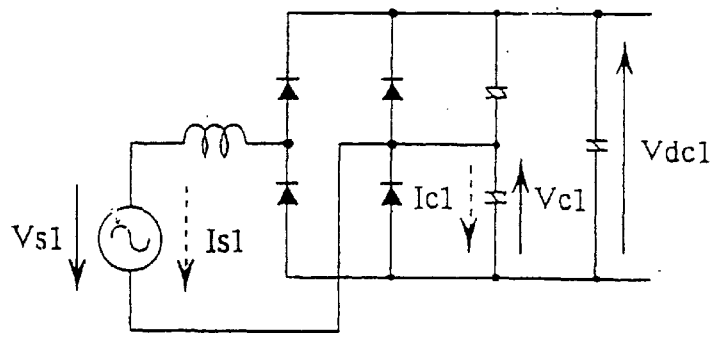
FIG. 15 is an electric diagram illustrating a voltage doubler rectification circuitry.
Figure 16:
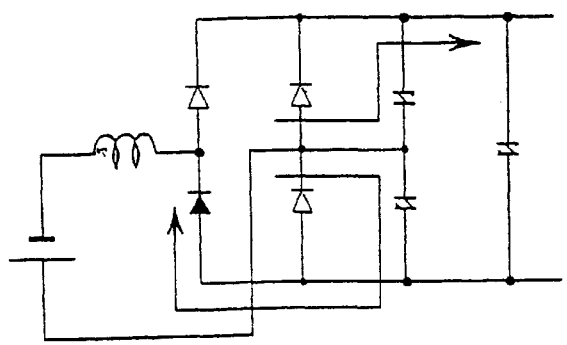
FIG. 16 is an electric diagram useful in understanding a first operation mode (mode 1) of the voltage doubler rectification circuitry.
Figure 17:
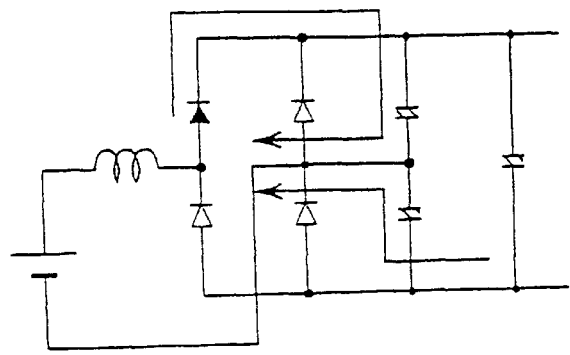
FIG. 17 is an electric diagram useful in understanding a second operation mode (mode 2) of the voltage doubler rectification circuitry.
Figure 18:
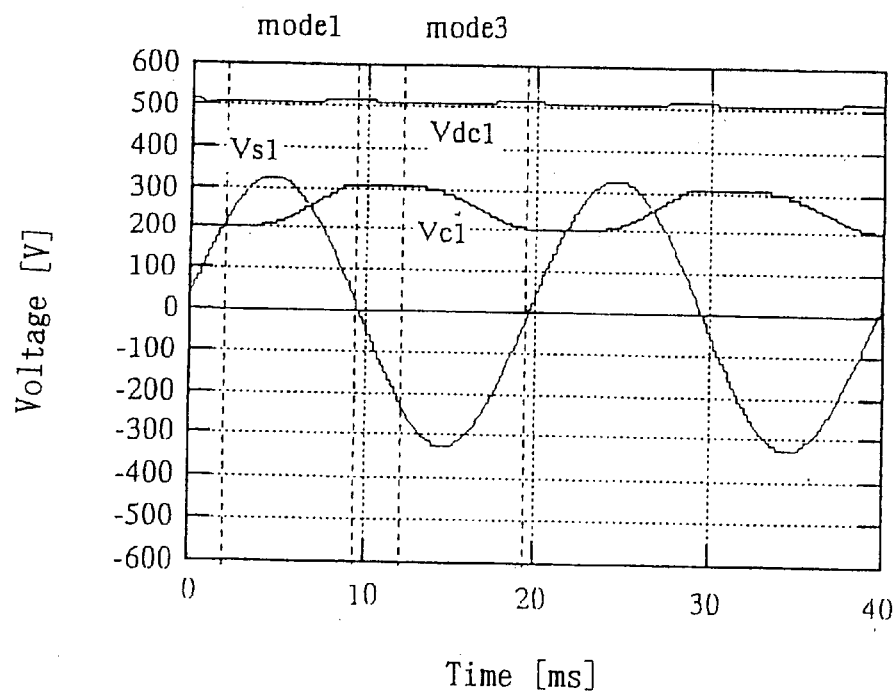
FIG. 18 is a diagram illustrating voltage waveforms of each section of the voltage doubler rectification circuitry.
Figure 19:
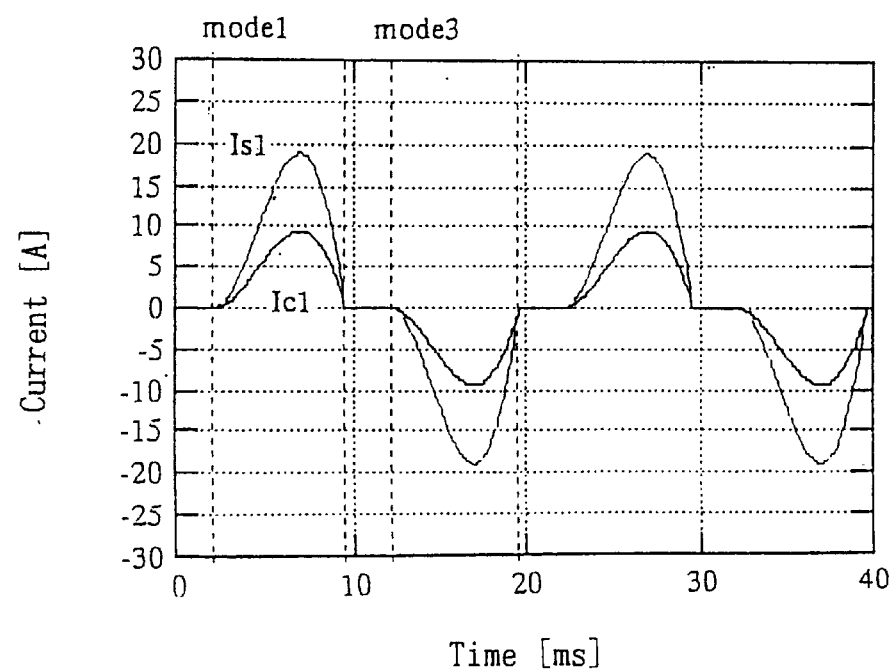
FIG. 19 is a diagram illustrating current waveforms of each section of the voltage doubler rectification circuitry.

FIGS. 2–5 are diagrams useful in understanding the operation mode mode 1–mode 4 of the single phase rectification apparatus which is illustrated in FIG. 1. Voltage waveforms of each section illustrated in FIG. 6 and current waveforms of each section illustrated in FIG. 7 are obtained by sequentially repeating those operation modes. The A.C. capacitor 6 is charged by the D.C. voltage $Vdc3$ which is obtained at the center point of the series connection circuit 5 of the pair of the electrolyte capacitors and the half wave of the power source voltage $Vs2$ so that the voltage changing extent of the A.C. capacitor 6 becomes $-Vdc3/2-+Vdc3/2$, thereby the application voltage of the A.C. capacitor 6 is determined to be an A.C. waveform. Further, it is sufficient that the rated voltage of each electrolyte capacitor is half of that of the electrolyte capacitor illustrated in FIGS. 15 and 20, because each electrolyte capacitor of the series connection circuit 5 is connected in series to one another to the D.C. section.

Figure 20:
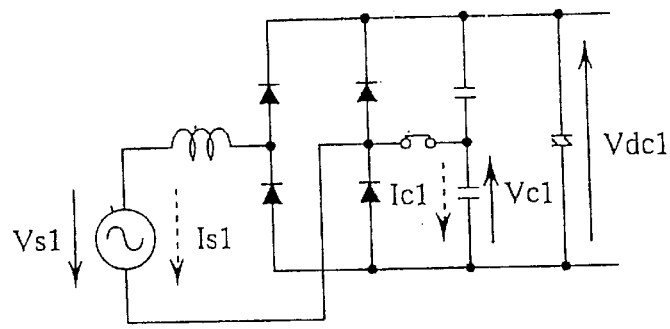
FIG. 20 is an electric diagram illustrating a conventional circuitry which includes the voltage doubler rectification circuitry as a fundamental circuitry.
Figure 21:
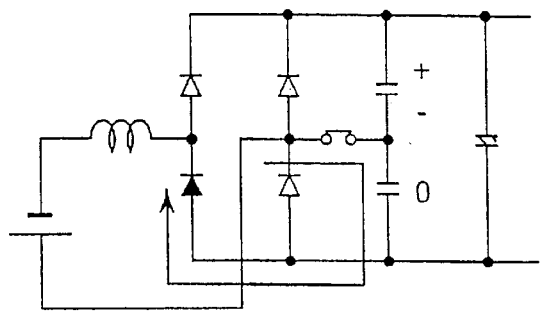
FIG. 21 is an electric diagram useful in understanding a first operation mode (mode 1) of the circuitry which is illustrated in FIG. 20.
Figure 22:
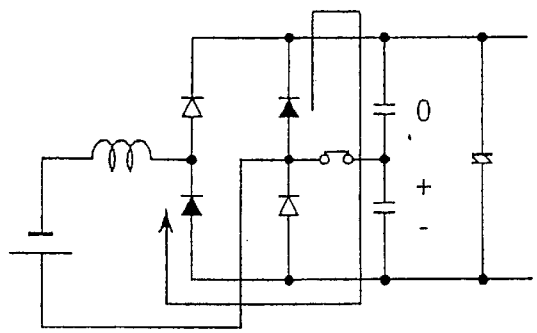
FIG. 22 is an electric diagram useful in understanding a second operation mode (mode 2) of the circuitry which is illustrated in FIG. 20.
Figure 23:
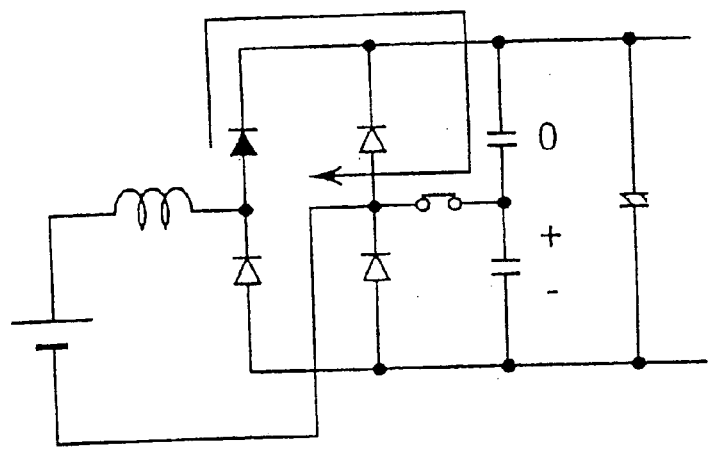
FIG. 23 is an electric diagram useful in understanding a third operation mode (mode 3) of the circuitry which is illustrated in FIG. 20.
Figure 24:
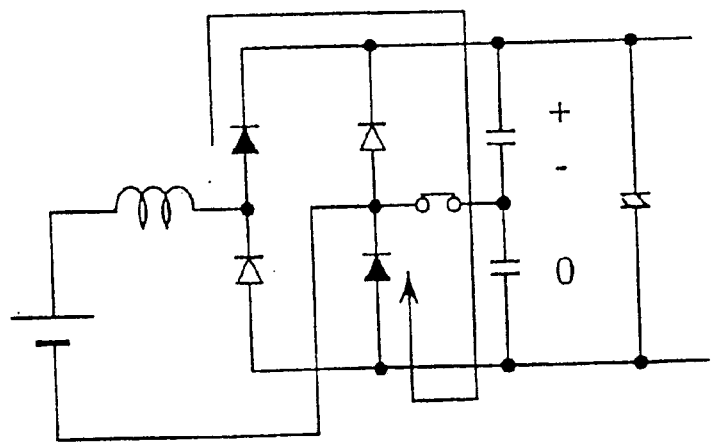
FIG. 24 is an electric diagram useful in understanding a fourth operation mode (mode 4) of the circuitry which is illustrated in FIG. 20.
Figure 25:
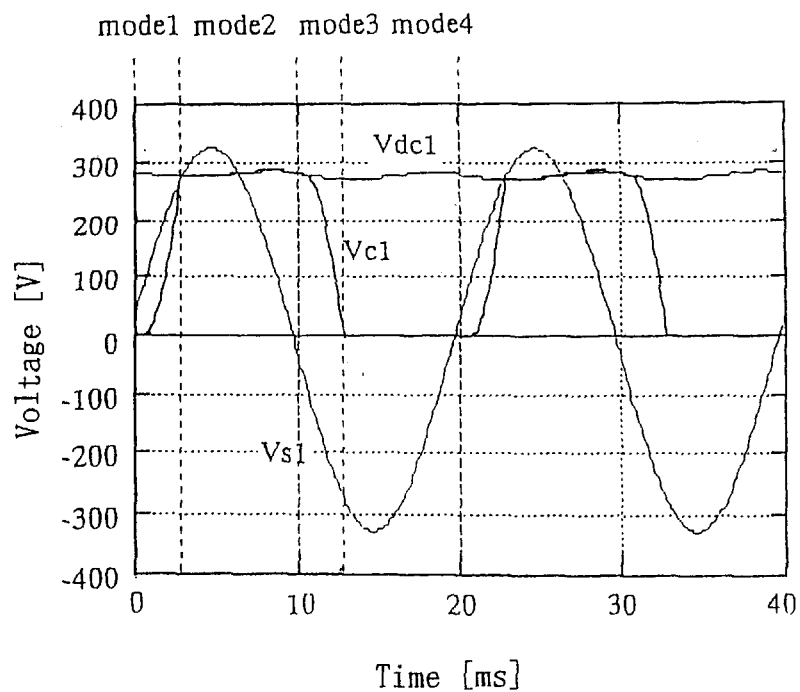
FIG. 25 is a diagram illustrating voltage waveforms of each section of the circuitry which is illustrated in FIG. 20.
Figure 26:
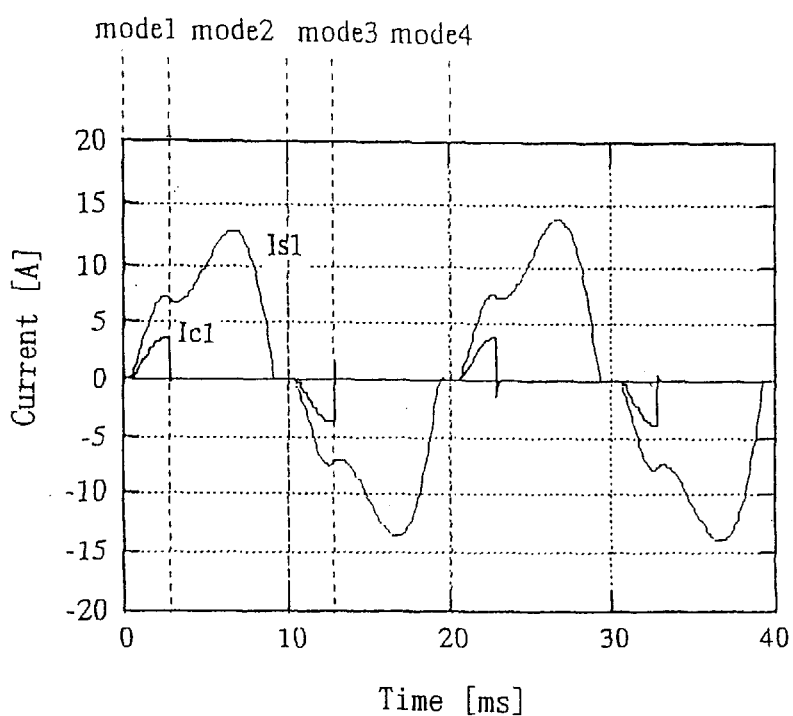
FIG. 26 is a diagram illustrating current waveforms of each section of the circuitry which is illustrated in FIG. 20.
Figure 29:
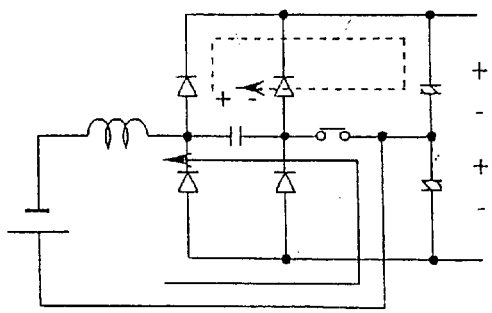
FIG. 29 is an electric diagram useful in understanding a first operation mode (mode 1) of the circuitry which is illustrated in FIG. 28.

The charge current for the A.C. capacitor 6 is double current and the voltage ripple is nearly equal to that of the conventional apparatus which is illustrated in FIG. 20, and the application voltage for each electrolyte capacitor of the series connection circuitry 5 is half of that of the conventional apparatus and the current for each electrolyte capacitor of the series connection circuitry 5 is equal to that of the conventional apparatus. Further, the conduction interval of each operation mode which is illustrated in one of FIG. 2 through FIG. 5 is equal to the conduction interval of the operation modes which are illustrated in FIG. 21 through FIG. 24. Therefore, the input current waveform which is in synchronism with that of the conventional apparatus which is illustrated in FIG. 20 (refer to FIG. 7 and FIG. 26), when the capacitance of each capacitor is determined to be the double capacitance of each capacitor which is illustrated in FIG. 20.

Figure 14:
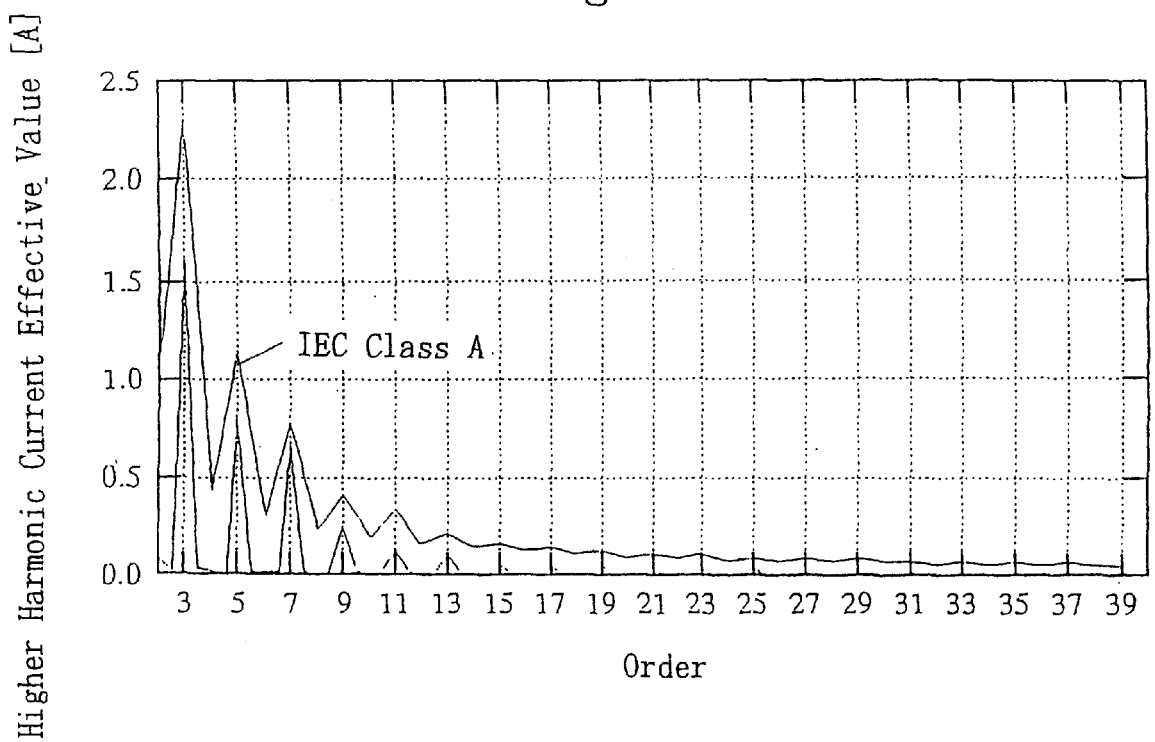
FIG. 14 is a diagram illustrating higher harmonics analysis result.

As is apparent from the foregoing description, a number of expensive A.C. capacitors can be decreased to be 1 which was 2 in the apparatus which is illustrated in FIG. 20. And, the withstand voltage of all capacitors can be decreased to ½ of that of the capacitor of the apparatus which is illustrated in FIG. 20. As a result, decrease in size and in cost are realized for the single phase rectification apparatus in its entirety. Higher harmonics analysis result is an analysis result which is illustrated in FIG. 14 when the reactor 2 is determined to have 18 mH, the A.C. capacitor 6 is determined to have 40 micro F, and the input power is determined to have 2 kW, therefore input current waveform accuracy in conformity to the IEC class A standards is obtained even when the rated voltages of elements are determined to be half of those of the conventional system.

The single phase rectification circuitry illustrated in FIG. 1 has a circuitry arrangement which includes the voltage doubler rectification circuitry as the fundamental circuitry so that the D.C. voltage rises to double voltage of the peak value of the power source voltage waveform when load is light and when the A.C. switch 7 is not opened (turned off).

Figure 8:
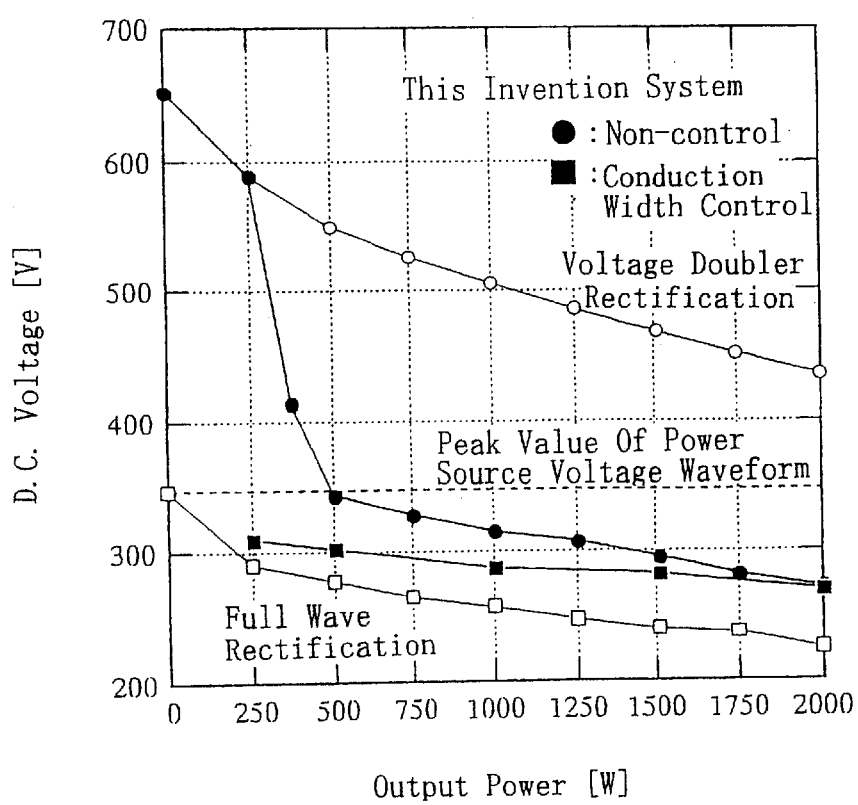
FIG. 8 is a diagram illustrating changing in D.C. voltages with respect to output power.

FIG. 8 illustrates variations in the D.C. voltage with respect to the output power. Wherein, white circles represent the variations due to the voltage doubler rectification, white squares represent the variations due to the full wave rectification, black circles represent the variations due to the single phase rectification circuitry which is illustrated in FIG. 1, and black squares represent the variations due to suppression in voltage increase which is described later, respectively.

When the suppression in voltage increase is not performed, the D.C. voltage increases because the discharge current of each electrolyte capacitor of the series connection circuitry 5 becomes smaller following the decrease in load. As to the above operation modes, this corresponds to the decrease in conduction interval of the full wave rectification operation (mode 2 and mode 4). When the D.C. voltage becomes equal to or more than the peak value of the power source voltage waveform, the apparatus performs only the voltage doubler rectification operation (mode 1 and mode 3). Further, the voltage doubler characteristic becomes dominant when load is light.

Figure 9:
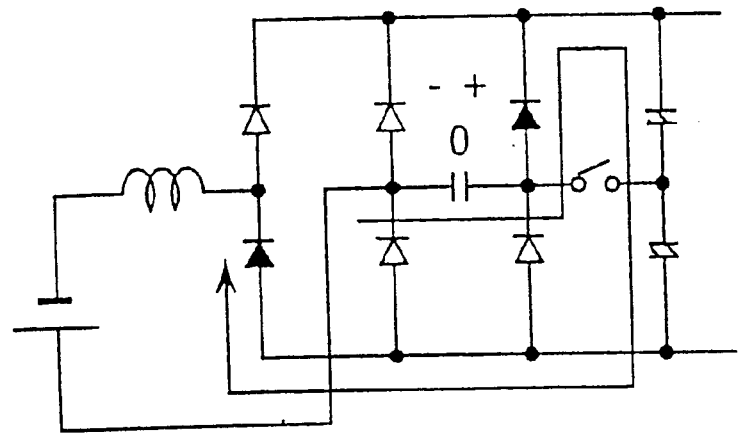
FIG. 9 is an electric diagram useful in understanding a fifth operation mode (mode 5) of the single phase rectification apparatus which is illustrated in FIG. 1.
Figure 10:
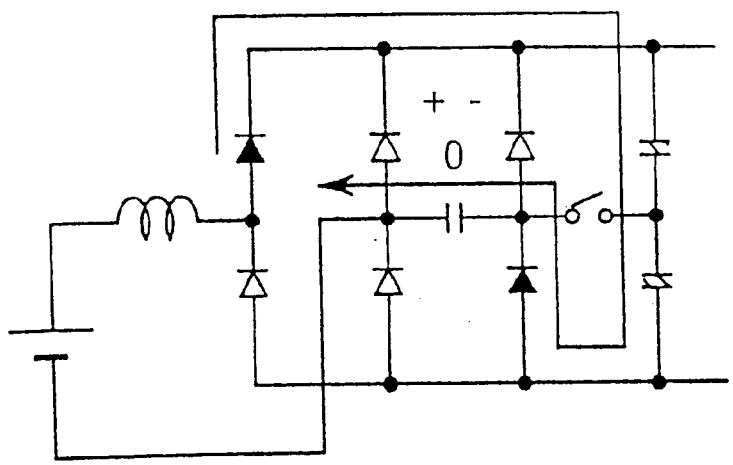
FIG. 10 is an electric diagram useful in understanding a sixth operation mode (mode 6) of the single phase rectification apparatus which is illustrated in FIG. 1.

But, the single phase rectification circuitry illustrated in FIG. 1 opens (turns off) the A.C. switch 7 when load is light so that the operation mode (mode 5 and mode 6) is generated which discharges the accumulation charge of the A.C. capacitor 6 through the series connection circuitry 4 of the pair of the diodes, as is illustrated in FIGS. 9 and 10. As a result, the center point of the series connection circuit 4 of the pair of the diodes and the center point of the series connection circuit 5 of the pair of the electrolyte capacitors are shut off from one another so as to perform only the full wave rectification operation, therefore the D.C. voltage can be determined to be equal to or less than the peak value of the power source voltage waveform. Further, the voltage of the A.C. capacitor 8 becomes zero by discharging the accumulation charge of the A.C. capacitor 6 through the series connection circuitry 4 of the pair of the diodes, and the rectification operation of the operation mode (mode 2 and mode 4) continues hereinafter. Wherein, the application voltage when the A.C. switch 7 is opened (turned off) becomes ±Vdc3/2 so that the withstand voltages of the elements are reduced to half voltages, because the application voltage is determined based upon the conduction conditions of the diodes of the full wave rectification circuitry. That is, the application voltages of the elements becomes ±Vdc3 in its maximum value so that the withstand voltages of the elements are reduced to half voltages by employing the arrangement illustrated in FIG. 1, because the A.C. capacitor 6 maintains a voltage which is just before the opening (turning off) of the A.C. switch 7 when the A.C. switch 7 is opened (turned off) and when the series connection circuitry 4 of the pair of the diodes is not provided.

Figure 11:
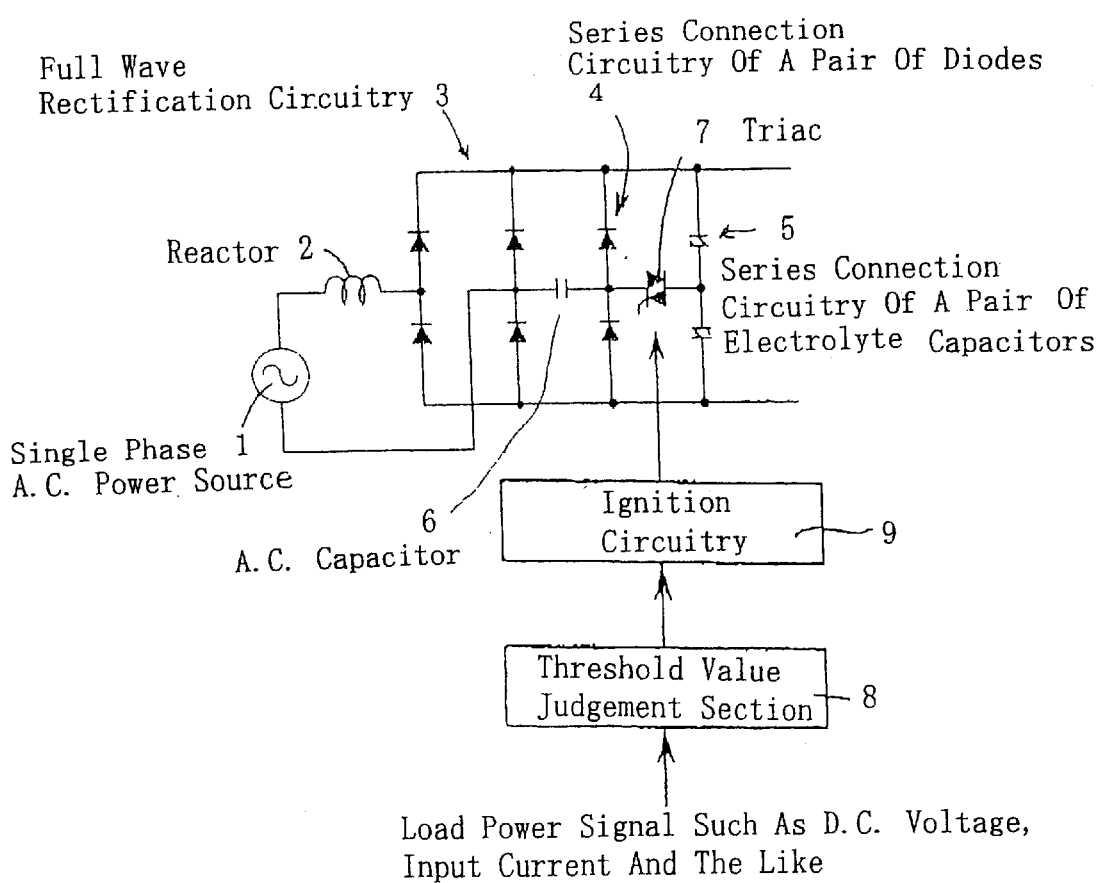
FIG. 11 is an electric diagram illustrating an arrangement of a single phase rectification apparatus of an example for suppressing the increase in voltage.

FIG. 11 is an electric diagram illustrating an arrangement of an example of a single phase rectification apparatus which performs suppression in voltage increase.

The single phase rectification apparatus illustrated in FIG. 11 is different from the single phase rectification circuitry illustrated in FIG. 1 in that the center point of the series connection circuitry 4 of the pair of the diodes and the center point of the series connection circuitry 5 of the pair of the electrolyte capacitors are connected to one another through a TRIAC 7 which serves as the A.C. switch, and that a threshold value judgment section 8 for inputting a signal which represents a load power and for comparing the signal and a previously determined threshold value, and an ignition circuitry 9 for inputting the output signal from the threshold value judgment section 8 and for supplying an ignition signal to the TRIAC 7 are provided.

Wherein, it is preferable that the threshold value is determined to be a threshold value which corresponds to the output power of 500 W by referring the black circles in FIG. 8, for example.

In this case, the center point of the series connection circuitry 4 of the pair of the diodes and the center point of the series connection circuitry 5 of the pair of the electrolyte capacitors are in short circuit to one another so as to perform the above operation when the output power is greater than 500 W, while the center point of the series connection circuitry 4 of the pair of the diodes and the center point of the series connection circuitry 5 of the pair of the electrolyte capacitors are shut off from one another so as to perform only the full wave rectification operation and determines the D.C. voltage equal to or less than the peak value of the power source voltage waveform when the output power is equal to or less than 500 W. Further, the rated voltage of the A.C. switch can be reduced to a half voltage similarly to the A.C. capacitor and the like, because the accumulation charge of the A.C. capacitor 6 is discharged through the series connection circuitry 4 of the pair of the diodes.

Figure 12:
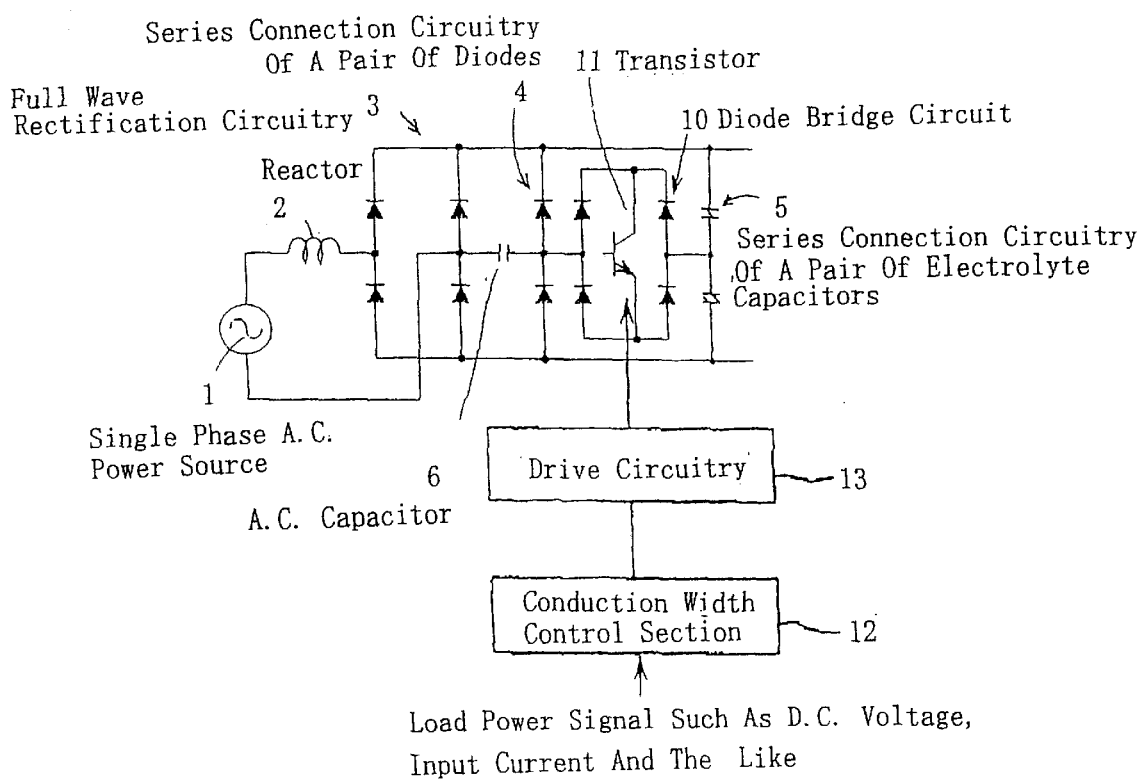
FIG. 12 is an electric diagram illustrating an arrangement of a single phase rectification apparatus of another example for suppressing the increase in voltage.

FIG. 12 is an electric diagram illustrating an arrangement of another example of a single phase rectification apparatus which performs suppression in voltage increase.

The single phase rectification circuitry illustrated in FIG. 12 is different from the single phase rectification circuitry illustrated in FIG. 1 in that the center point of the series connection circuitry 4 of the pair of the diodes and the center point of the series connection circuitry 5 of the pair of the electrolyte capacitors are connected to one another through a circuitry which is made of a diode bridge circuitry 10 and a transistor 11 which is connected its collector-emitter terminals to the diode bridge circuitry 10 in parallel, and that a conduction width control section 12 for inputting a signal representing a load power and for performing conduction width controlling, and a drive circuitry 13 for inputting the output signal from the conduction width control section 12 and for supplying a drive signal to the transistor 11 are provided.

When this arrangement is employed and when the conduction phase of the A.C. switch is determined to be 50 degrees, the D.C. voltage was controlled, as is illustrated by black squares in FIG. 8. Further, the rated voltage of the A.C. switch can be reduced to a half voltage similarly to the A.C. capacitor and the like.

Figure 13:
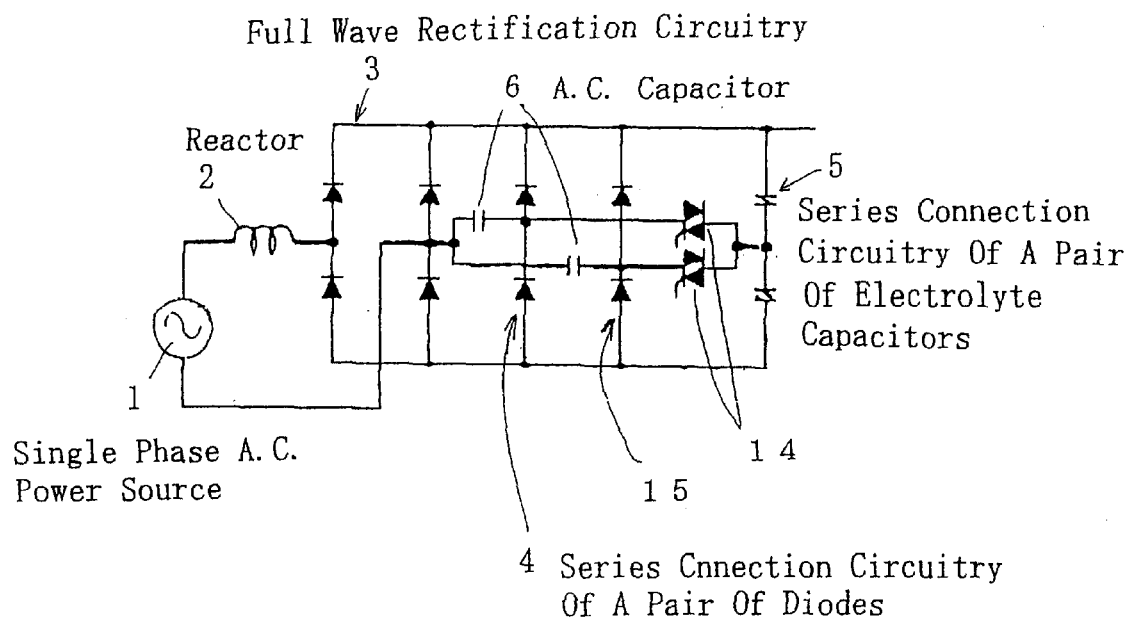
FIG. 13 is an electric diagram illustrating an arrangement of a single phase rectification apparatus of a further example for suppressing the increase in voltage.

FIG. 13 is an electric diagram illustrating an arrangement of a further example of a single phase rectification apparatus which performs suppression in voltage increase.

The single phase rectification circuitry illustrated in FIG. 13 is different from the single phase rectification circuitry illustrated in FIG. 1 in that the series connection circuitry 4 of the pair of the diodes and a series connection circuitry 15 of a pair of diodes are connected in parallel to one another between the output terminals of the full wave rectification circuitry 3, two series connection circuitry each made of the A.C. capacitor 6 and a TRIAC 14 are connected in parallel to one another between one input terminal of the full wave rectification circuitry 3 and the center point of the series connection circuitry 5 of the pair of the smoothing capacitors, the center point of one A.C. capacitor 6 and one TRIAC 14 and the center point of the series connection circuitry 4 of the pair of the diodes are connected to one another, and the center point of the other A.C. capacitor 6 and the other TRIAC 14 and the center point of the series connection circuitry 15 of the pair of the diodes are connected to one another.

When this arrangement is employed, the combined capacitance of the both A.C. capacitances 6 can be varied by controlling the both TRIACs 14. As a result, the D.C. voltage can be controlled within a wide power extent. Of course, it is possible that more than three series connection circuitry are connected in parallel to one another, each series connection circuitry being made of the TRIAC 14 and the A.C. capacitor 6. In this case, the D.C. voltage can be controlled within a wider power extent.

FIG. 28 is an electric diagram illustrating a single phase rectification circuitry of a further embodiment according to the present invention.

In this single phase rectification apparatus, a reactor 22 is connected to a single phase A.C. power source 21, and a parallel connection circuitry of a half wave rectification circuitry 23 and a series connection circuitry 25 of a pair of boosting capacitors is connected to the series connection circuitry of the single phase A.C. power source 21 and the reactor 22. And, a series connection circuitry 26 of a pair of diodes is connected between the output terminals of the half wave rectification circuitry 23. An A.C. capacitor 24 is connected between the input terminal of the half wave rectification circuitry 23 and the center point of the series connection circuitry of the pair of the diodes. An A.C. switch 27 is connected between the center point of the series connection circuitry 25 of the pair of the boosting capacitors and the center point of the series connection circuitry 26 of the pair of the diodes.

Figure 32:
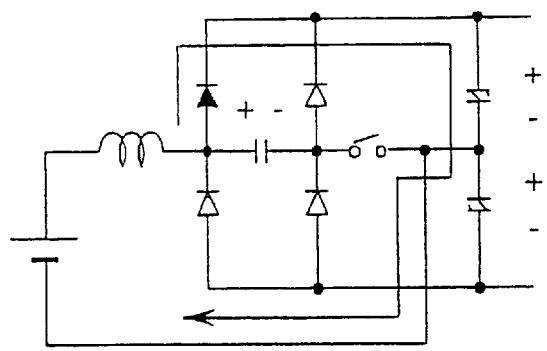
FIG. 32 is an electric diagram useful in understanding a fourth operation mode (mode 4) of the circuitry which is illustrated in FIG. 28.
Figure 33:
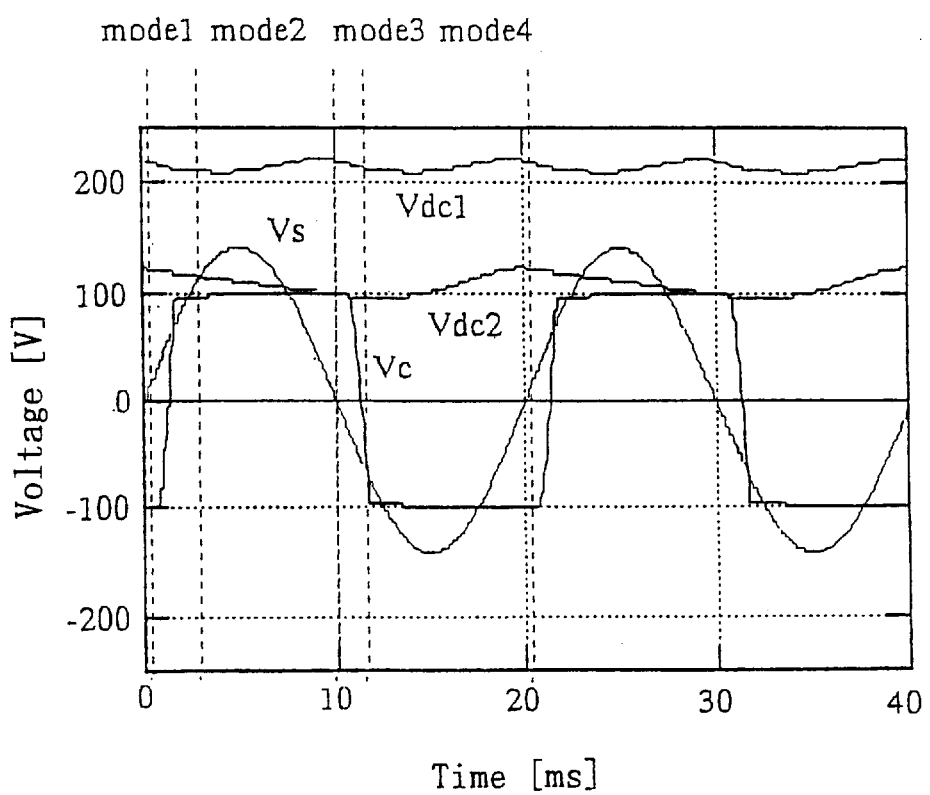
FIG. 33 is a diagram illustrating voltage waveforms of each section of the single phase rectification apparatus which is illustrated in FIG. 28.
Figure 34:
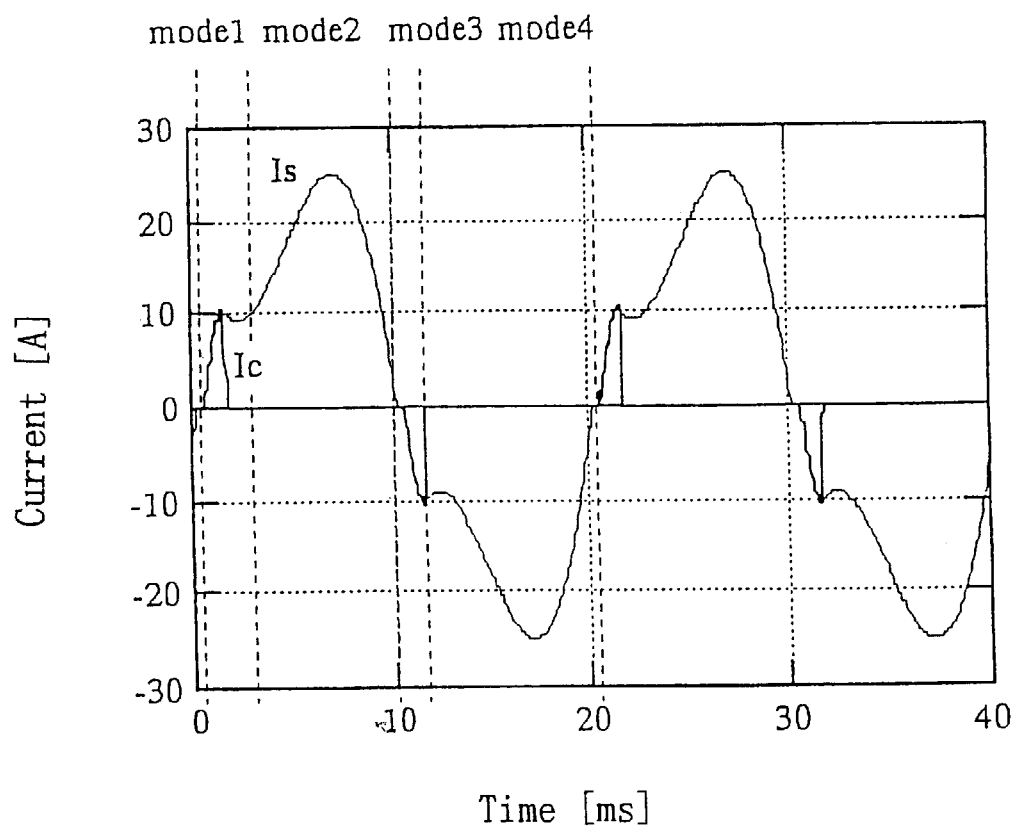
FIG. 34 is a diagram illustrating current waveforms of each section of the single phase rectification apparatus which is illustrated in FIG. 28.
Figure 35:
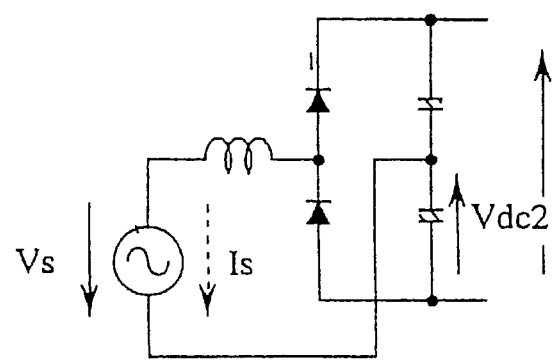
FIG. 35 is an electric diagram illustrating a voltage doubler rectification fundamental circuitry.
Figure 36:
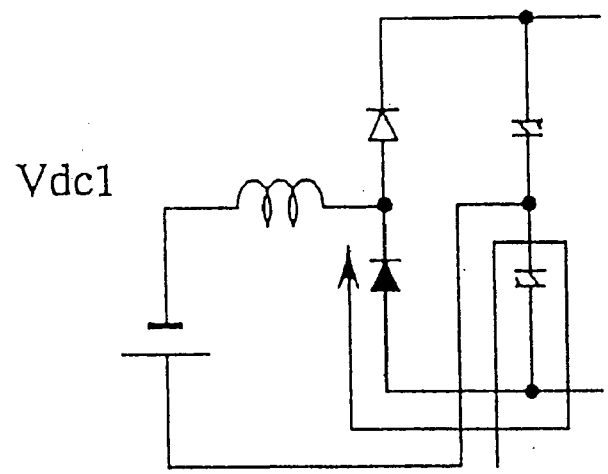
FIG. 36 is an electric diagram useful in understanding a second operation mode (mode 2) of the voltage doubler rectification fundamental circuitry which is illustrated in FIG. 35.
Figure 37:
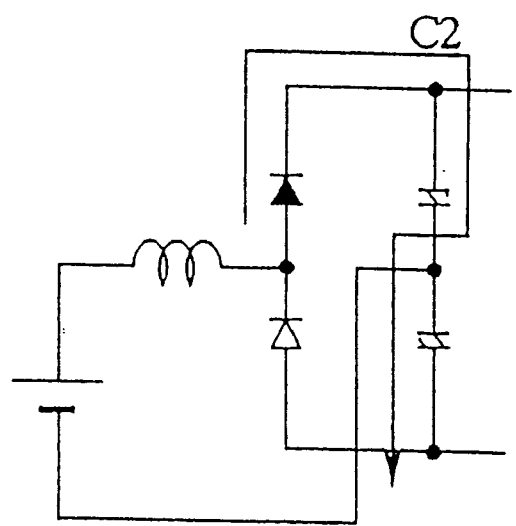
FIG. 37 is an electric diagram useful in understanding a fourth operation mode (mode 4) of the voltage doubler rectification fundamental circuitry which is illustrated in FIG. 35.
Figure 38:
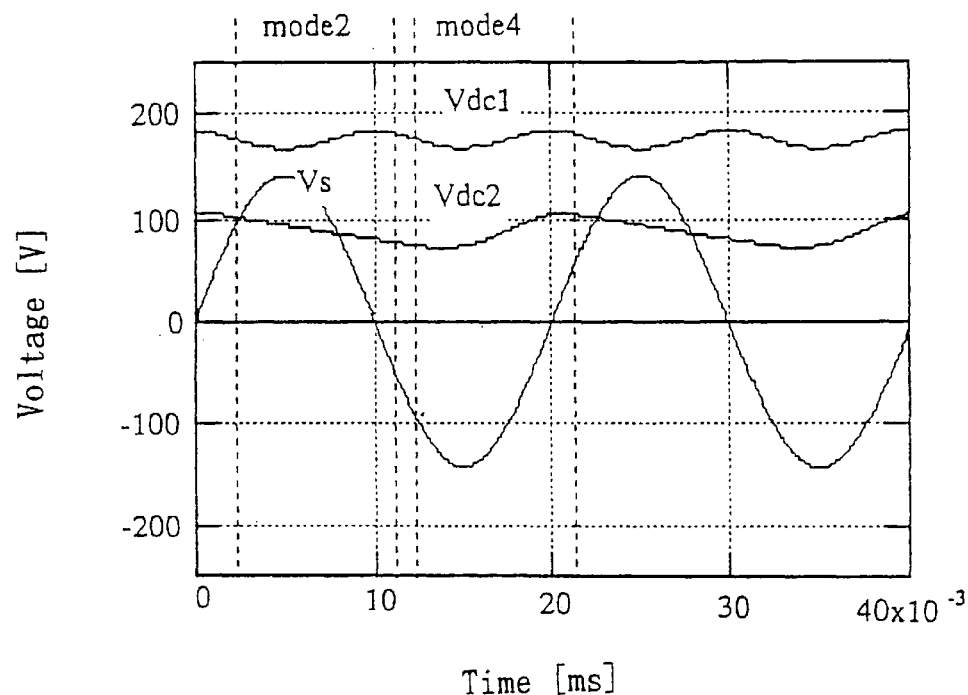
FIG. 38 is a diagram illustrating voltage waveforms of each section of the voltage doubler rectification fundamental circuitry which is illustrated in FIG. 35.
Figure 39:
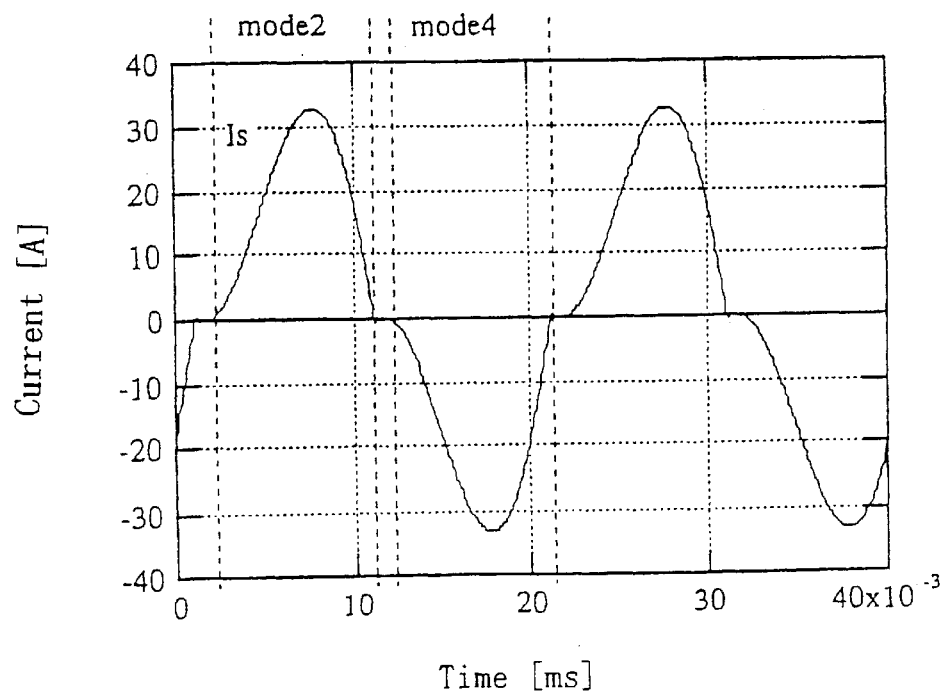
FIG. 39 is a diagram illustrating current waveforms of each section of the voltage doubler rectification fundamental circuitry which is illustrated in FIG. 35.

FIG. 29 through FIG. 32 are electric diagrams useful in understanding operation modes mode 1–mode 4 of the single phase rectification circuitry which is illustrated in FIG. 28. And, voltage waveforms of each section which are illustrated in FIG. 33 and current waveforms of each section which are illustrated in FIG. 34 are obtained by sequentially repeating those operation modes. More particularly, the operation modes mode 2 and mode 4 are operation modes for alternately charging each boosting capacitor of the series connection circuitry 25 (refer to FIGS. 36 and 37 in addition), similarly to the voltage doubler rectification fundamental circuitry illustrated in FIG. 35, so that each boosting capacitor is charged by half waves of the single phase A.C. power source 21. Therefore, the voltage which is double of the peak value of the power source waveform can be obtained at the series connection circuitry 25 of the pair of the boosting capacitors (refer to FIG. 38 which illustrates voltage waveforms of each section and FIG. 39 which illustrates current waveforms of each section, in addition). Further, the operation modes mode 1 and mode 3 are intervals corresponding to current non-conduction intervals of the voltage doubler rectification fundamental circuitry illustrated in FIG. 35. In the single phase rectification apparatus illustrated in FIG. 28, the A.C. capacitor 24 is connected between the input terminal of the half wave rectification circuitry 23 and the center point of the series connection circuitry 26 of the pair of the diodes so that the A.C. capacitor 24 is charged which supplies the advance current. As a result, the current conduction width is enlarged and the power factor is improved. Further, the withstand voltage of the A.C. capacitor 24 can be decreased to a voltage which is half of the withstand voltage of the A.C. capacitor in FIG. 20.

Figure 40:
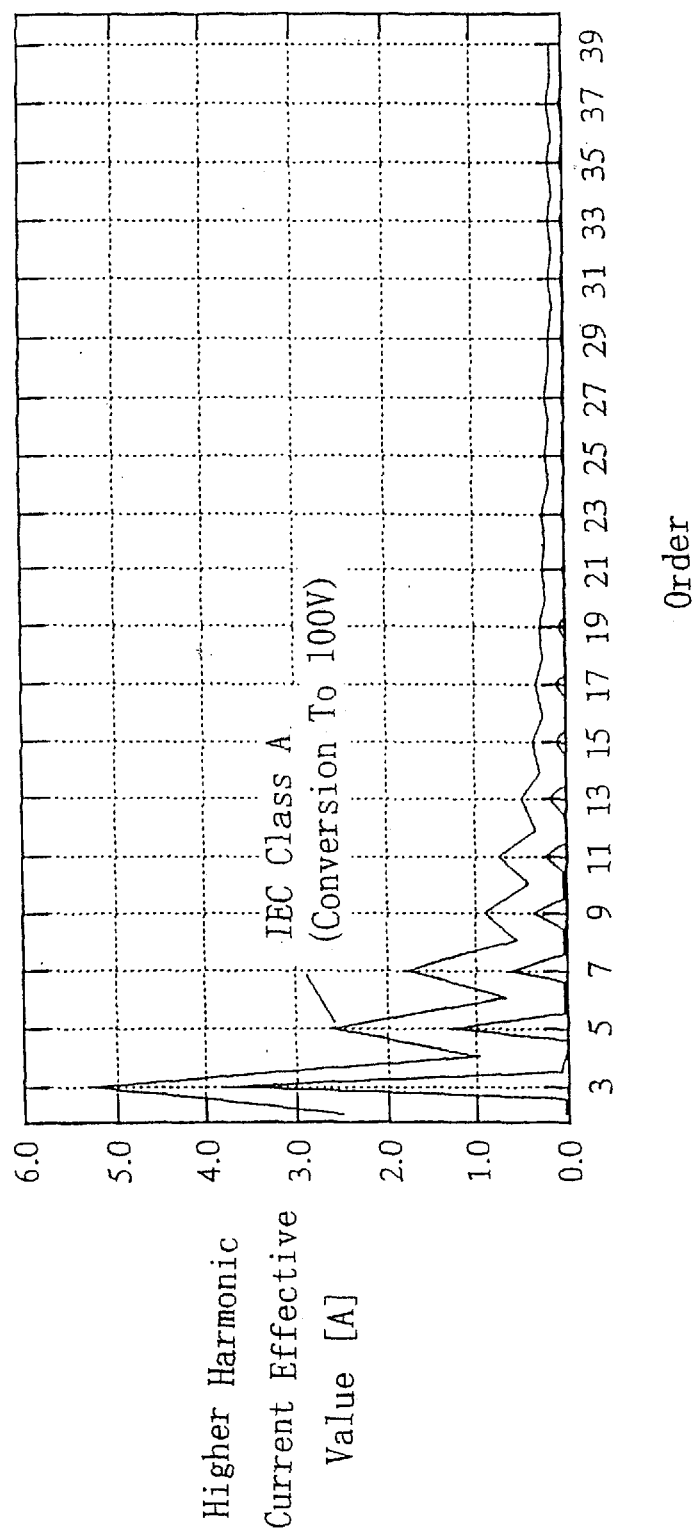
FIG. 40 is a diagram illustrating a relationship between higher harmonics current effective values of each order of the voltage doubler rectification fundamental circuitry which is illustrated in FIG. 35 and the IEC standard class A (conversion into 100V)
Figure 41:
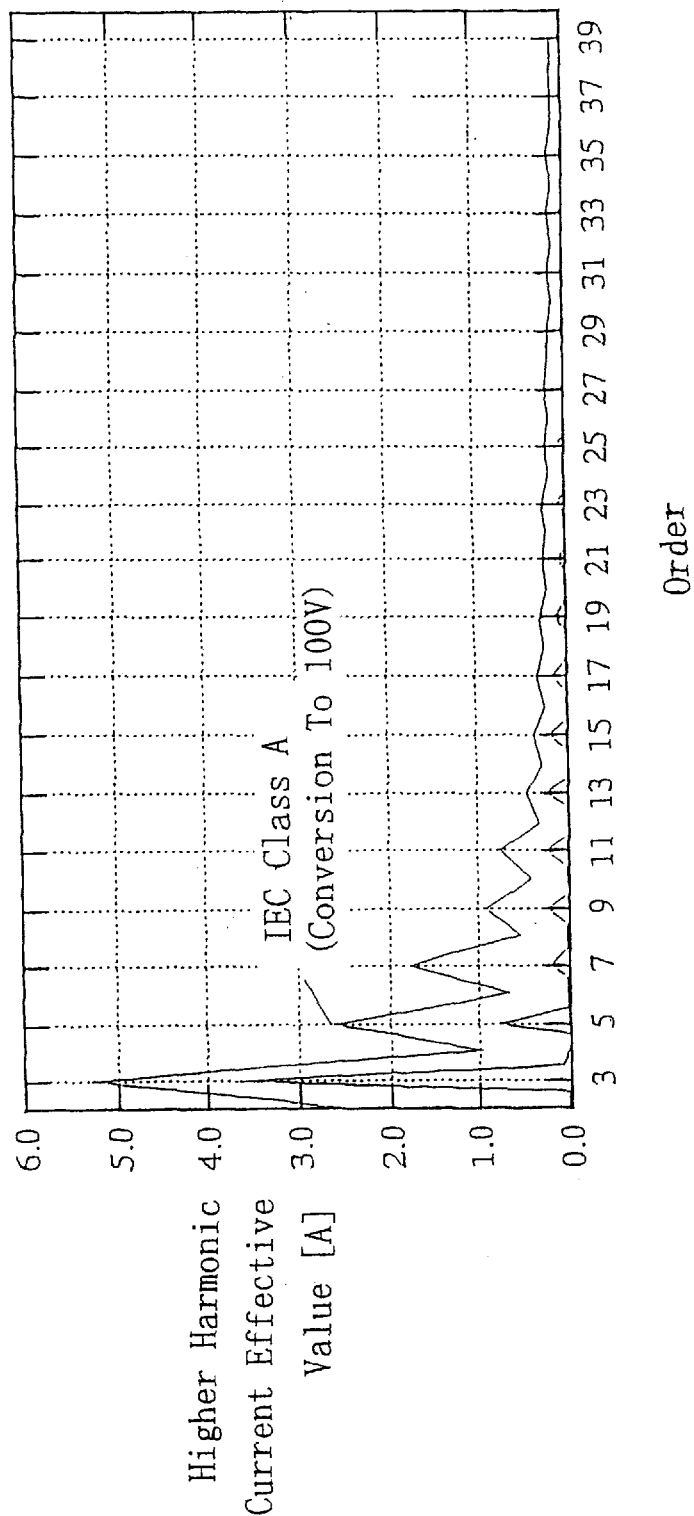
FIG. 41 is a diagram illustrating a relationship between higher harmonics current effective values of each order of the single phase rectification circuitry which is illustrated in FIG. 28 and the IEC standard class A (conversion into 100V)

Specifically, because of the maximum supplying current of the 100V system for home being 15A, for example, the reactor becomes 8 mH in the conventional voltage doubler rectification fundamental circuitry (capacitors of the pair of boosting electrolyte capacitors are the same to one another and are 3000 micro F) when the maximum power is determined to be 1500 W and when constants are selected for satisfying the IEC standards class A, as is illustrated in FIG. 40. When the constants are selected in such manner, the current becomes the delay power factor due to determination of the inductance to be great so that the input power factor is decreased to about 72%. Further, the D.C. voltage is 175V and is decreased to about 62% of the peak value of the voltage doubler waveform. On the contrary, when the capacitors of the pair of the boosting capacitors which construct the series connection circuitry 25 of the single phase rectification apparatus illustrated in FIG. 28 and the inductance of the reactor 22 are determined to have the above values and when the capacitance of the A.C. capacitor 24 is determined to be 40 micro F, the input power factor is 90.8%, the D.C. voltage is 214V and is 76.4% of the peak value of the voltage doubler waveform. That is, the higher D.C. voltage is obtained, and the input power factor is increased. Further, it is sufficient that the series connection circuitry 26 of the pair of the diodes and one A.C. capacitor 24 are added with respect to the conventional voltage doubler rectification fundamental circuitry, and the withstand voltage of the A.C. capacitor 24 can be made smaller so that the complexity in arrangement is greatly suppressed, and the increase in size and in cost are greatly suppressed. Of course, the IEC standards class A (conversion to 100V) are satisfied, as is illustrated in FIG. 41.

Figure 42:
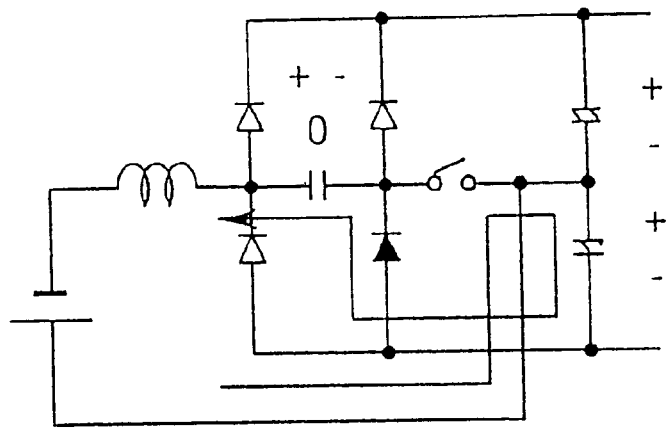
FIG. 42 is a diagram useful in understanding a fifth operation mode mode 5 of the single phase rectification circuitry which is illustrated in FIG. 28.
Figure 43:
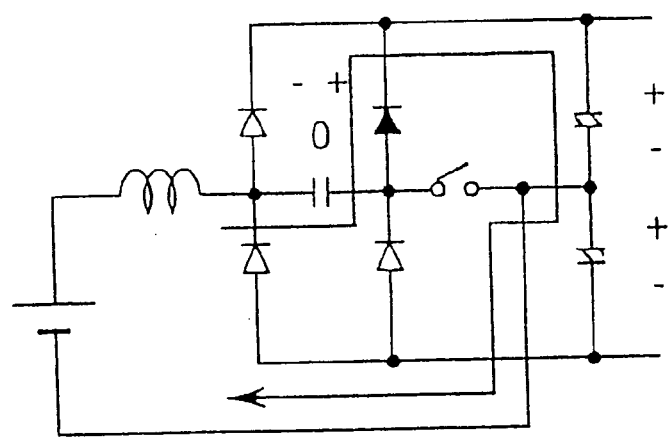
FIG. 43 is a diagram useful in understanding a sixth operation mode mode 6 of the single phase rectification circuitry which is illustrated in FIG. 28.

But, the single phase rectification apparatus illustrated in FIG. 28 turns off the A.C. switch 27 when load is light so that the operation modes (mode 5 and mode 6) are generated which discharge the accumulation charge of the A.C. capacitor 24 through the series connection circuitry 26 of the pair of the diodes, as is illustrated in FIGS. 42 and 43. As a result, the center point of the series connection circuitry 26 of the pair of the diodes and the center point of the series connection circuitry 25 of the pair of the boosting capacitors are shut off from one another so as to perform only the half wave rectification operation, therefore the D.C. voltage can be determined to be equal to or less than the peak value of the power source voltage waveform. Further, the voltage of the A.C. capacitor 24 becomes zero by discharging the accumulation charge of the A.C. capacitor 24 through the series connection circuitry 26 of the pair of the diodes, and the rectification operation by the operation modes (mode 2 and mode 4) are continued hereinafter. Wherein, when the A.C. switch 27 is turned off, the application voltage is determined based upon the conduction condition of the diodes of the full wave rectification circuitry and is determined to be ±Vdc1/2 so that the withstand voltages of the elements are decreased to have half voltages. That is, when the series connection circuitry 26 of the pair of the diodes is not present, the A.C. capacitor 24 maintains the voltage which is just prior to the turning off when the A.C. switch 27 is turned off, so that the application voltage to the elements becomes ±Vdc1 in its maximum value. Therefore, it is understood that the withstand voltages of the elements can be decreased to have half voltages by employing the arrangement illustrated in FIG. 28.

Figure 44:
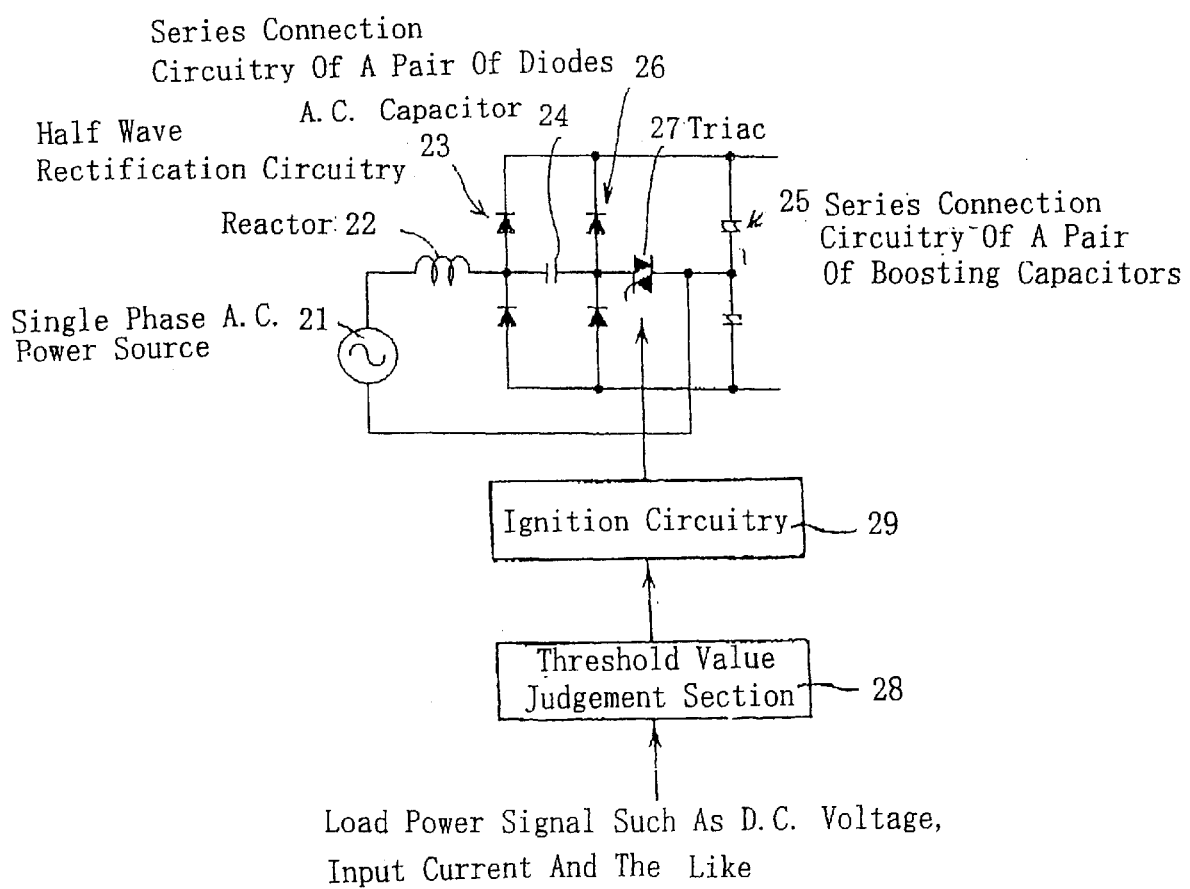
FIG. 44 is an electric diagram illustrating an arrangement of an example which dissolves the disadvantage in that an advancing current flows when load is light.

FIG. 44 is an electric diagram illustrating an arrangement of a single phase rectification apparatus of an example which dissolves the disadvantage that the advance current flows when load is light.

The single phase rectification apparatus illustrated in FIG. 44 is different from the single phase rectification apparatus illustrated in FIG. 28 in that a TRIAC 27 which is a species of the A.C. switch is connected between the center point of the series connection circuitry 26 of the pair of the diodes and a terminal among the terminals of the single phase A.C. power source 21 which terminal is not connected to the reactor 22, that a threshold value judgment section 28 is provided for inputting a signal such as the D.C. voltage, input current or others, representing a load power and for comparing the signal and a predetermined threshold value so as to judge whether or not load is light, and an ignition circuitry 29 is provided for inputting the output signal from the threshold value judgment section 28 and for supplying an ignition signal to the TRIAC 27.

Wherein, it is preferable that the threshold value is determined to be a threshold value which corresponds to the output power of 500 W similarly to the single phase rectification apparatus illustrated in FIG. 11, for example.

When the output power is greater than 500 W, the above voltage doubler rectification operation is carried out, because the center point of the series connection circuitry 26 of the pair of the diodes and the center point of the series connection circuitry 25 of the pair of the boosting capacitors are made to be short circuit condition. On the contrary, when the output power is equal to or less than 500 W, only the half wave rectification operation is carried out so that the D.C. voltage is determined to be equal to or less than the peak value of the power source voltage waveform, center point of the series connection circuitry 26 of the pair of the diodes and the center point of the series connection circuitry 25 of the pair of the boosting capacitors are shut off. Further, the rated voltage of the TRIAC 27 can be decreased to have half voltage similarly to the A.C. capacitor and the like. Of course, decrease in higher harmonics can be realized.

Figure 45:
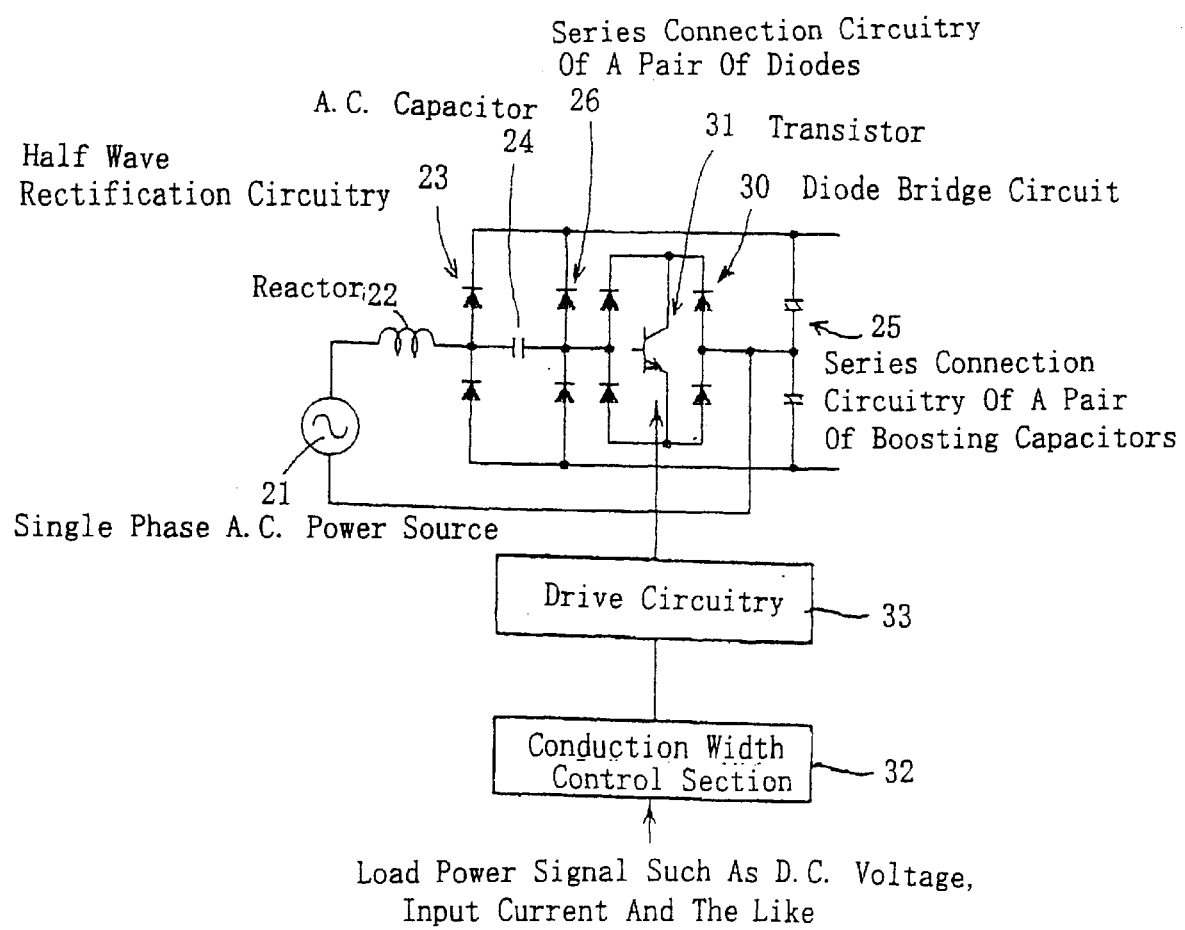
FIG. 45 is an electric diagram illustrating an arrangement of another example which dissolves the disadvantage in that an advancing current flows when load is light.

FIG. 45 is an electric diagram illustrating an arrangement of a single phase rectification apparatus of another example which dissolves the above disadvantage.

The single phase rectification apparatus illustrated in FIG. 45 is different from the single phase rectification apparatus illustrated in FIG. 44 in that a circuitry comprising a diode bridge circuitry 30 and a transistor 31 which is connected its collector-emitter terminals in parallel to the diode bridge circuitry 30 is employed instead the TRIAC 27, and that a conduction width control section 32 for inputting a signal such as the D.C. voltage, input current or others, representing a load power and for performing the conduction width controlling and a drive circuitry 33 for inputting the output signal from the conduction width control section 32 and for supplying a drive signal to the transistor 31 are provided instead the threshold value judgment section 28 and the ignition circuitry 29.

In this case, operations and effects are realized which are similar to those of the single phase rectification apparatus illustrated in FIG. 44, by controlling the conduction width of the transistor 31.

Figure 46:
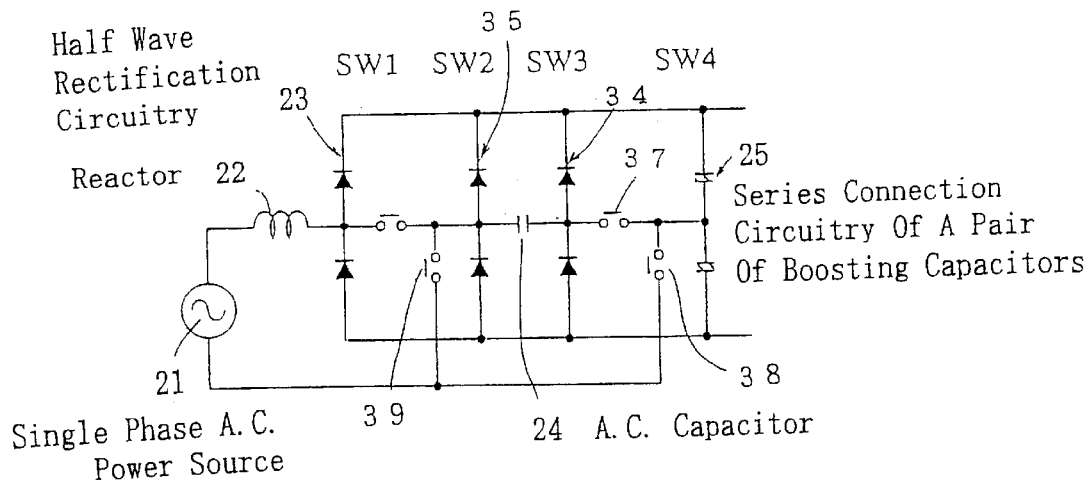
FIG. 46 is an electric diagram illustrating a single phase rectification apparatus of a further embodiment according to the present invention.

FIG. 46 is an electric diagram of a single phase rectification apparatus of a further embodiment according to the present invention.

In this single phase rectification apparatus, a half wave rectification circuitry 23 and a series connection circuitry 25 of a pair of electrolyte capacitors are connected in parallel to one another, a series connection circuitry 34 of a pair of first diodes is connected in parallel to the series connection circuitry 25 of the pair of the electrolyte capacitors, a series connection circuitry 35 of a pair of second diodes is connected in parallel to the half wave rectification circuitry 23, an A.C. capacitor 24 is connected between the center point of the series connection circuitry 35 of the pair of the second diodes and the series connection circuitry 34 of the pair of the first diodes, a first switch 36 is connected between the center point of the series connection circuitry 35 of the pair of the second diodes and the input terminal of the half wave rectification circuitry 23, a second switch 37 is connected between the center point of the pair of the electrolyte capacitors and the center point of the series connection circuitry 34 of the pair of the first diodes, one terminal of a single phase A.C. power source 21 is connected to the input terminal of the half wave rectification circuitry 23 through a reactor 22, the other terminal of the single phase A.C. power source 21 is connected to the center point of the series connection circuitry 25 of the pair of the electrolyte capacitors through a third switch 38, and the other terminal of the single phase A.C. power source 21 is connected to the center point of the series connection circuitry 35 of the pair of the second diodes through a fourth switch. Further, the first switch 36, the second switch 37, the third switch 38 and the fourth switch 39 are controlled their ON condition and OFF condition, as is illustrated in Table 1, depending upon the condition whether it is a regular condition or a light load condition and depending upon the rectification whether it is the full wave rectification or voltage doubler rectification. Further, in Table 1, the first switch 36 is represented with SW1, the second switch 37 is represented with SW2, the third switch 38 is represented with SW3, and the fourth switch 39 is represented with SW4.

TABLE 1

|  |  | SW1 | SW2 | SW3 | SW4 |
|---|---|---|---|---|---|
| Regular Condition | Full Wave Rectification | OFF | ON | OFF | ON |
|  | Voltage Doubler Rectification | ON | ON | ON | OFF |
| Light Load Condition | Full Wave Rectification | OFF | OFF | OFF | ON |
|  | Voltage Doubler Rectification | ON | OFF | ON | OFF |

This single phase rectification apparatus can be arranged by employing a relay as the A.C. switch, and is preferable for a case that the control such as phase control or the like, at every half cycle of the power source is not carried out. And, the apparatus can selectively carry out the full wave rectification operation and the voltage doubler rectification operation, and the apparatus can cope with the regular condition and the light load condition by controlling ON, OFF condition of the first switch 36, the second switch 37, the third switch 38 and the fourth switch 39, as are illustrated in Table 1.

As a result, the apparatus supplies the stable D.C. voltage despite the power source voltage by carrying out the full wave rectification operation for the single phase 200V power source and by carrying out the voltage doubler rectification operation for the single phase 100V power source, for example. In other words, the single phase rectification apparatus can be present which is applicable to the single phase 100V power source and the single phase 200V power source.

Further, arrangements other than the arrangement illustrated in FIG. 46 can be employed as the single phase rectification apparatus for coping with different power sources which arrangements are sufficient to selectively carrying out the full wave rectification operation and the voltage doubler rectification operation.

Figure 47:
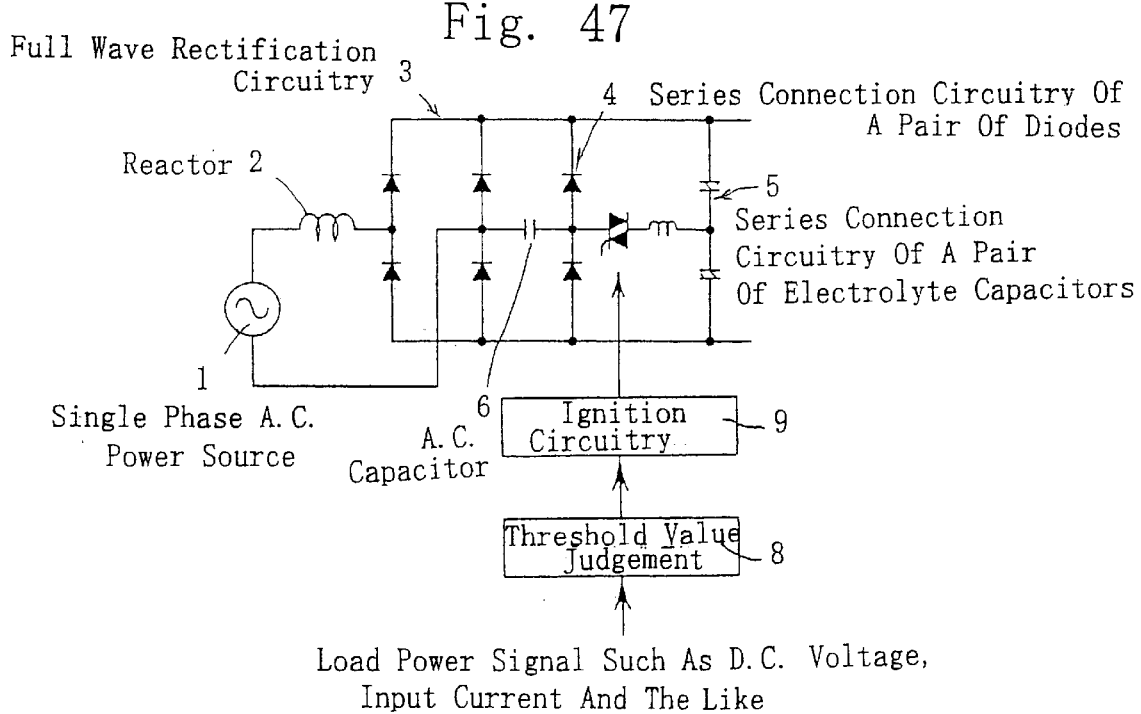
FIG. 47 is an electric diagram illustrating a single phase rectification apparatus of a further embodiment according to the present invention.

FIG. 47 is an electric diagram of a single phase rectification apparatus of a further embodiment according to the present invention.

This single phase rectification apparatus is different from the single phase rectification apparatus illustrated in FIG. 11 in that the center point of the series connection circuitry 4 of the pair of the diodes and the center point of the series connection circuitry 5 of the pair of the electrolyte capacitors are connected to one another through an A.C. switch which is a series connection circuitry of a TRIAC 7 and an inductor 7a instead the A.C. switch comprising only the TRIAC 7.

Operations and effects of this embodiment is as follows.

When the center point of the series connection circuitry 4 of the pair of the diodes and the center point of the series connection circuitry 5 of the pair of the electrolyte capacitors are connected to one another through only the TRIAC 7, the residual current of the TRIAC 7 after the mode has changed from the TRIAC 7 to the diode, because a current which is obtained by dividing the current just prior to the mode change based upon the impedance ratio of the electrolyte capacitor and the A.C. capacitor 6. When the residual current of the TRIAC 7 is equal to or smaller than the minimum current (holding current) of the TRIAC 7, the TRIAC 7 can be shut off. But, when the load current is great, the TRIAC 7 cannot be shut off during a half cycle of the power source so that a disadvantage arises in that characteristics such as power factor, D.C. voltage and the like become discontinuous depending upon the load current.

When the arrangement illustrated in FIG. 47 is employed, the TRIAC 7 is securely shut off by the following operations.

When the transition period for the mode change from the A.C. switch to the diode, there is an interval when both the diode current and the TRIAC current flow. During the interval, the initial accumulation energy of the inductor 7a serially connected to the TRIAC 7 moves to the A.C. capacitor 6 by the LC resonance, and when the most current has moved to the diode, the voltage of the A.C. capacitor 6 is raised. Wherein, the voltages of the TRIAC 7, inductor 7a and the A.C. capacitor 6 are constrained by the electrolyte capacitor and diode so that a reverse bias voltage is applied to the TRIAC 7, consequently the TRIAC 7 is securely shut off.

Further, operations and effects are realized which are similar to those of the single phase rectification apparatus illustrated in FIG. 11.

Figure 48:
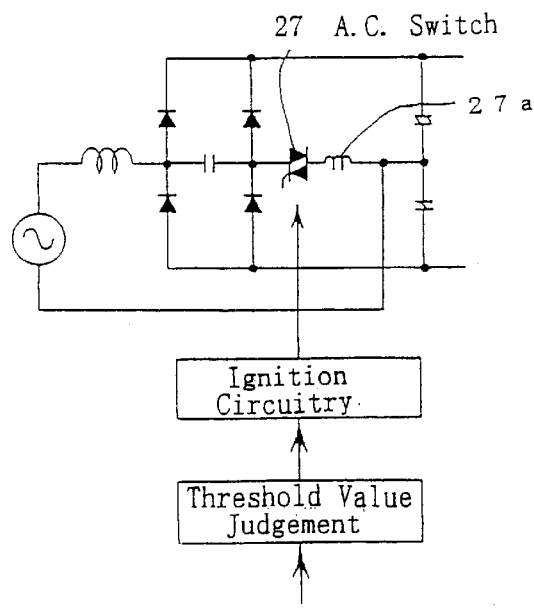
FIG. 48 is an electric diagram illustrating a single phase rectification apparatus of a further embodiment according to the present invention.

FIG. 48 is an electric diagram illustrating a single phase rectification apparatus of a further embodiment according to the present invention.

This single phase rectification apparatus is different from the single phase rectification apparatus illustrated in FIG. 44 in that the center point of the series connection circuitry 26 of the pair of the diodes and the center point of the series connection circuitry 25 of the pair of the boosting capacitors are connected to one another through an A.C. switch which is a series connection circuitry of a TRIAC 27 and an inductor 27a instead the A.C. switch comprising only the TRIAC 27.

When this embodiment is employed, the TRIAC 27 can be securely shut off even when the load current is great. Also, operations and effects are realized which are similar to those of the single phase rectification apparatus illustrated in FIG. 44.

Figure 49:
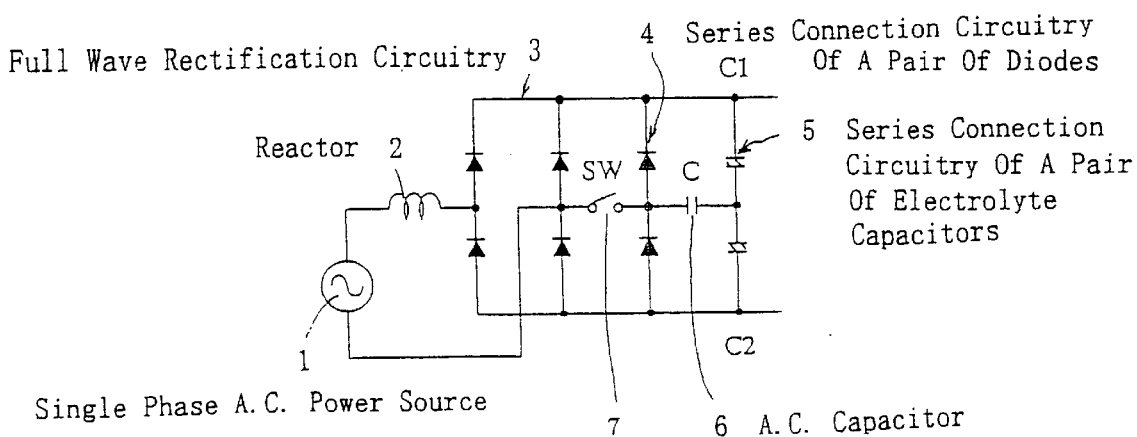
FIG. 49 is an electric diagram illustrating a single phase rectification apparatus of a further embodiment according to the present invention.
Figure 50:
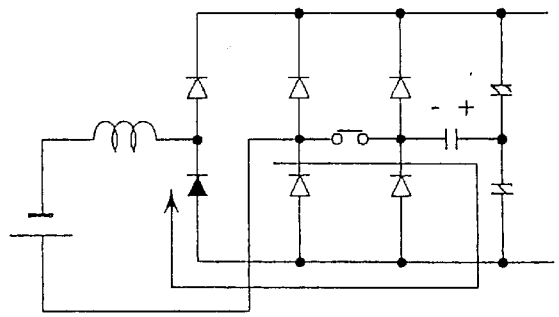
FIG. 50 is an electric diagram useful in understanding a first operation mode (mode 1) of the single phase rectification apparatus which is illustrated in FIG. 49.
Figure 51:
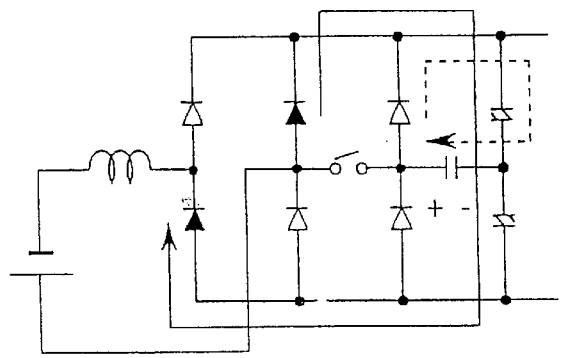
FIG. 51 is an electric diagram useful in understanding a second operation mode (mode 2) of the single phase rectification apparatus which is illustrated in FIG. 49.
Figure 52:
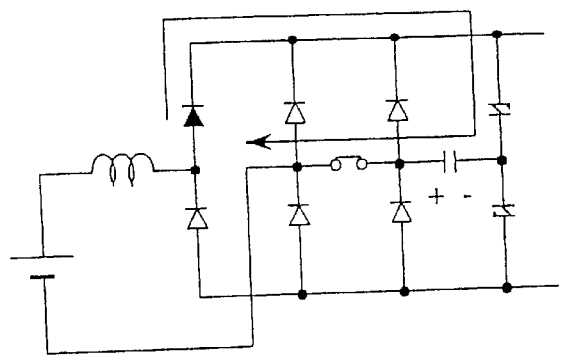
FIG. 52 is an electric diagram useful in understanding a third operation mode (mode 3) of the single phase rectification apparatus which is illustrated in FIG. 49.
Figure 53:
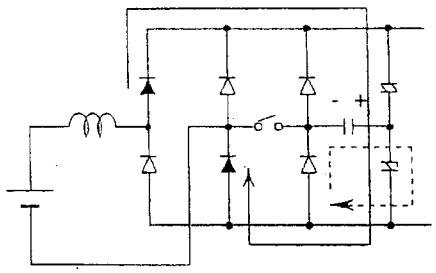
FIG. 53 is an electric diagram useful in understanding a fourth operation mode (mode 4) of the single phase rectification apparatus which is illustrated in FIG. 49.

FIG. 49 is an electric diagram illustrating a single phase rectification apparatus of a further embodiment according to the present invention.

This single phase rectification apparatus is different from the single phase rectification apparatus illustrated in FIG. 1 in that the A.C. switch 7 and the A.C. capacitor 6 are changed their places.

FIG. 50 through FIG. 53 are electric diagrams useful in understanding the operation modes mode 1–mode 4 of the single phase rectification apparatus illustrated in FIG. 49. Voltage waveforms of each section which are similar to those of FIG. 6 and current waveforms of each section which are similar to those of FIG. 7 are obtained by sequentially repeating those operation modes.

Figure 3:
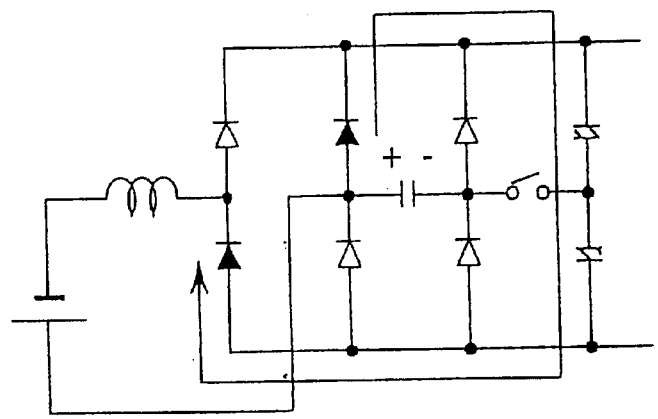
FIG. 3 is an electric diagram useful in understanding a second operation mode (mode 2) of the single phase rectification apparatus which is illustrated in FIG. 1.
Figure 4:
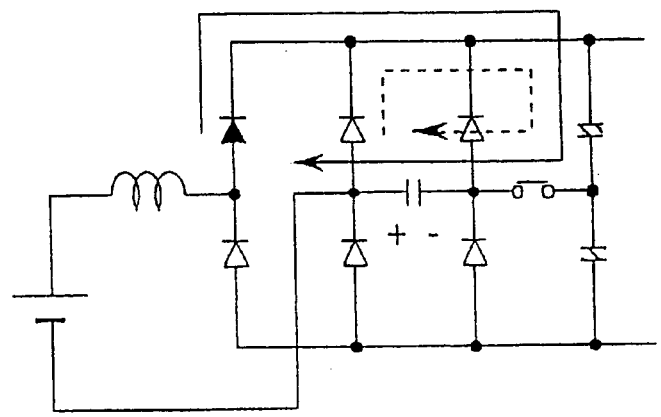
FIG. 4 is an electric diagram useful in understanding a third operation mode (mode 3) of the single phase rectification apparatus which is illustrated in FIG. 1.
Figure 5:
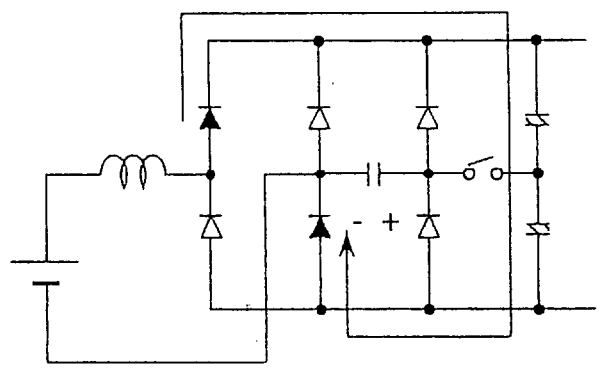
FIG. 5 is an electric diagram useful in understanding a fourth operation mode (mode 4) of the single phase rectification apparatus which is illustrated in FIG. 1.

In the operation modes mode 2 and mode 4, the opening (or closing) operation of the A.C. switch 7 is carried out during rectification operation. But, the potential of the A.C. capacitor 6 is discharged from the voltage just prior to the opening of mode 1, mode 3 in response to the voltage decrease of the electrolyte capacitor through one of the pair of the diodes 4, as is illustrated with dashed lines in FIGS. 51 and 53. As a result, the short circuit current during transition of mode 1, mode 3 is prevented from occurrence so that connection to a load which has a great power change is possible without raising the rated currents of elements. When the single phase rectification apparatus illustrated in FIG. 1 is employed, the opening operation of the A.C. switch 7 is carried out during the rectification operation of the mode 2 and mode 4 which are illustrated in FIGS. 3 and 5. During this operation, the voltage of the A.C. capacitor 6 is maintained to be the voltage which is prior to the opening operation of mode 1, mode 3. Therefore, when the apparatus is connected to a load which has a great power change and when the voltage of the electrolyte capacitor is greatly lowered in mode 2, mode 4, the short circuit current is transiently generated, as is illustrated with dashed lines in FIGS. 2 and 4 during the transient periods of mode 1, mode 3 so that the current carrying capacity of the A.C. switch 7 is increased for some cases.

But, when the single phase rectification apparatus illustrated in FIG. 49 is employed, the short circuit current during the transient periods of mode 1, mode 3 is prevented from occurrence. In this case, modes mode 5, mode 6 illustrated in FIGS. 9 and 11 do not exist, the withstand voltage of the A.C. switch 7 cannot be decreased to a half voltage, while only the withstand voltage of the A.C. capacitor 6 can be decreased to a half voltage.

Figure 54:
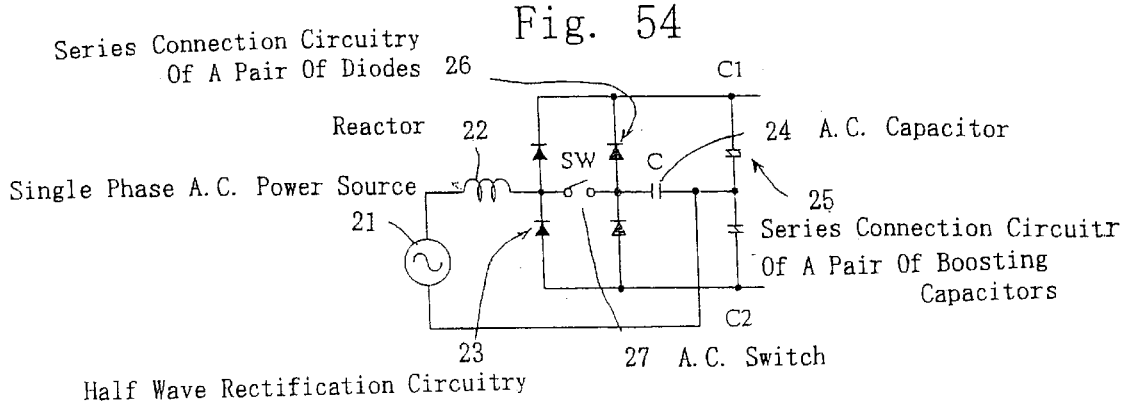
FIG. 54 is an electric diagram illustrating a single phase rectification apparatus of a further embodiment according to the present invention.
Figure 55:
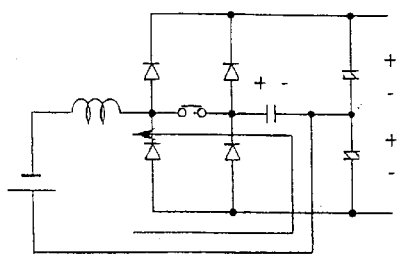
FIG. 55 is an electric diagram useful in understanding a first operation mode (mode 1) of the single phase rectification apparatus which is illustrated in FIG. 54.
Figure 56:
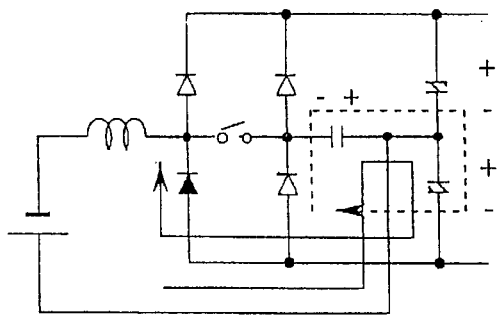
FIG. 56 is an electric diagram useful in understanding a second operation mode (mode 2) of the single phase rectification apparatus which is illustrated in FIG. 54.
Figure 57:
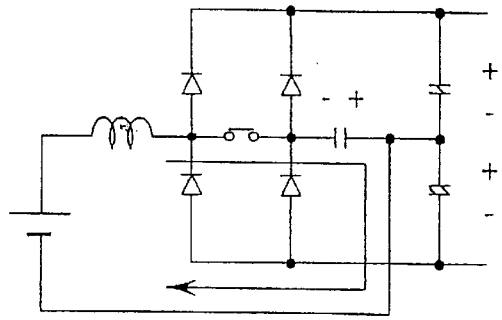
FIG. 57 is an electric diagram useful in understanding a third operation mode (mode 3) of the single phase rectification apparatus which is illustrated in FIG. 54.
Figure 58:
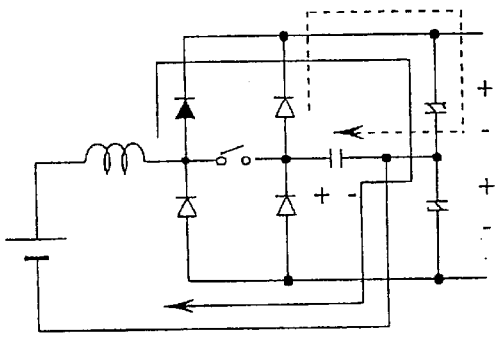
FIG. 58 is an electric diagram useful in understanding a fourth operation mode (mode 4) of the single phase rectification apparatus which is illustrated in FIG. 54.

FIG. 54 is an electric diagram of a single phase rectification apparatus of a further embodiment according to the present invention.

This single phase rectification apparatus is different from the single phase rectification apparatus illustrated in FIG. 28 in that the A.C. switch 27 and the A.C. capacitor 24 are changed their places.

FIG. 55 through FIG. 58 are electric diagrams useful in understanding the operation modes mode 1–mode 4 of the single phase rectification apparatus illustrated in FIG. 54. Voltage waveforms of each section which are similar to those of FIG. 33 and current waveforms of each section which are similar to those of FIG. 34 are obtained by sequentially repeating those operation modes.

Figure 30:
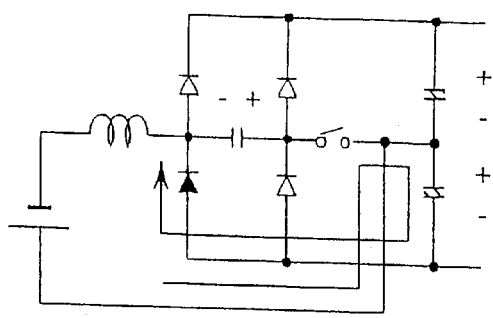
FIG. 30 is an electric diagram useful in understanding a second operation mode (mode 2) of the circuitry which is illustrated in FIG. 28.
Figure 31:
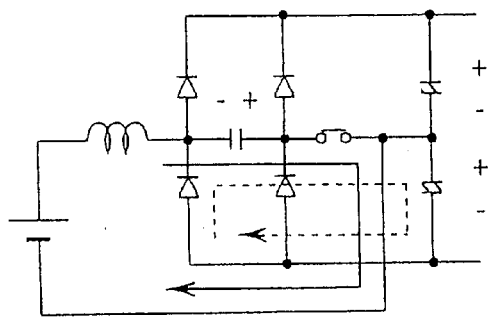
FIG. 31 is an electric diagram useful in understanding a third operation mode (mode 3) of the circuitry which is illustrated in FIG. 28.

In the operation modes mode 2 and mode 4, the opening (or closing) operation of the A.C. switch 27 is carried out during rectification operation. But, the potential of the A.C. capacitor 24 is discharged from the voltage just prior to the opening of mode 1, mode 3 in response to the voltage decrease of the electrolyte capacitor through one of the pair of the diodes 26, as is illustrated with dashed lines in FIGS. 56 and 58. As a result, the short circuit current during transition of mode 1, mode 3 is prevented from occurrence so that connection to a load which has a great power change is possible without raising the rated currents of elements. When the single phase rectification apparatus illustrated in FIG. 28 is employed, the opening operation of the A.C. switch 27 is carried out during the rectification operation of the mode 2 and mode 4 which are illustrated in FIGS. 30 and 32. During this operation, the voltage of the A.C. capacitor 24 is maintained to be the voltage which is prior to the opening operation of mode 1, mode 3. Therefore, when the apparatus is connected to a load which has a great power change and when the voltage of the boosting capacitor is greatly lowered in mode 2, mode 4, the short circuit current is transiently generated, as is illustrated with dashed lines in FIGS. 29 and 31 during the transient periods of mode 1, mode 3 so that the current carrying capacity of the A.C. switch 27 is increased for some cases.

But, when the single phase rectification apparatus illustrated in FIG. 54 is employed, the short circuit current during the transient periods of mode 1, mode 3 is prevented from occurrence. In this case, the withstand voltage of the A.C. switch 27 cannot be decreased to a half voltage, while only the withstand voltage of the A.C. capacitor 24 can be decreased to a half voltage.

Figure 59:
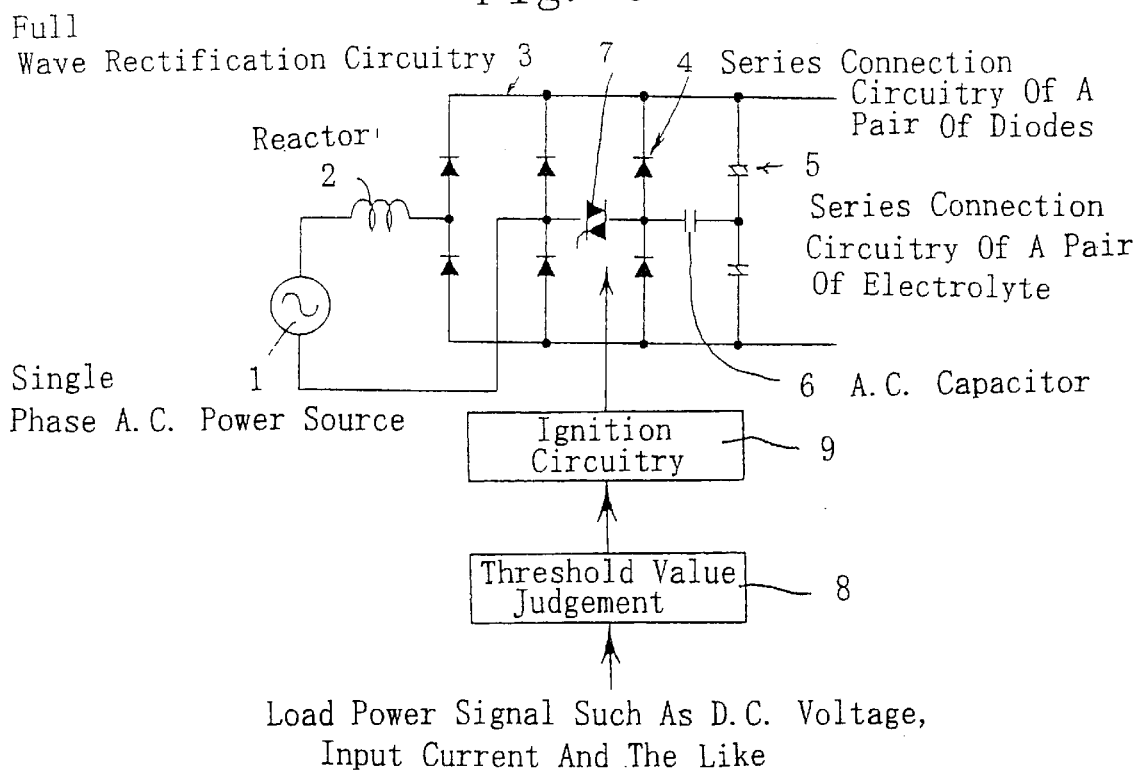
FIG. 59 is an electric diagram illustrating a single phase rectification apparatus of a further embodiment according to the present invention.

FIG. 59 is an electric diagram of a single phase rectification apparatus of a further embodiment according to the present invention.

This single phase rectification apparatus is different from the single phase rectification apparatus illustrated in FIG. 49 in that the center point of the series connection circuitry 4 of the pair of the diodes and one input terminal of the full wave rectification circuitry 3 are connected to one another through a TRIAC 7 which serves as the A.C. switch, and that a threshold value judgment section 8 for inputting a signal representing a load power and for comparing the signal with a previously determined threshold value and an ignition circuitry 9 for inputting the output signal from the threshold value judgment section 8 and for supplying an ignition signal to the TRIAC 7 are provided.

Wherein, the threshold value is preferably determined to be a threshold value which corresponds to the output power of 500 W, similarly to the embodiment illustrated in FIG. 11.

When the output power is greater than 500 W, connection of the center point of the series connection circuitry 4 of the pair of the diodes and one input terminal of the full wave rectification circuitry 3 becomes short circuit condition so that the above operation is carried out. On the contrary, when the output power is equal to or less than 500 W, the center point of the series connection circuitry 4 of the pair of the diodes and one input terminal of the full wave rectification circuitry 3 are shut off from one another so that the full wave rectification operation is carried out, consequently the D.C. voltage can be determined to be a voltage which is equal to or less than the peak value of the power source voltage waveform.

Figure 60:
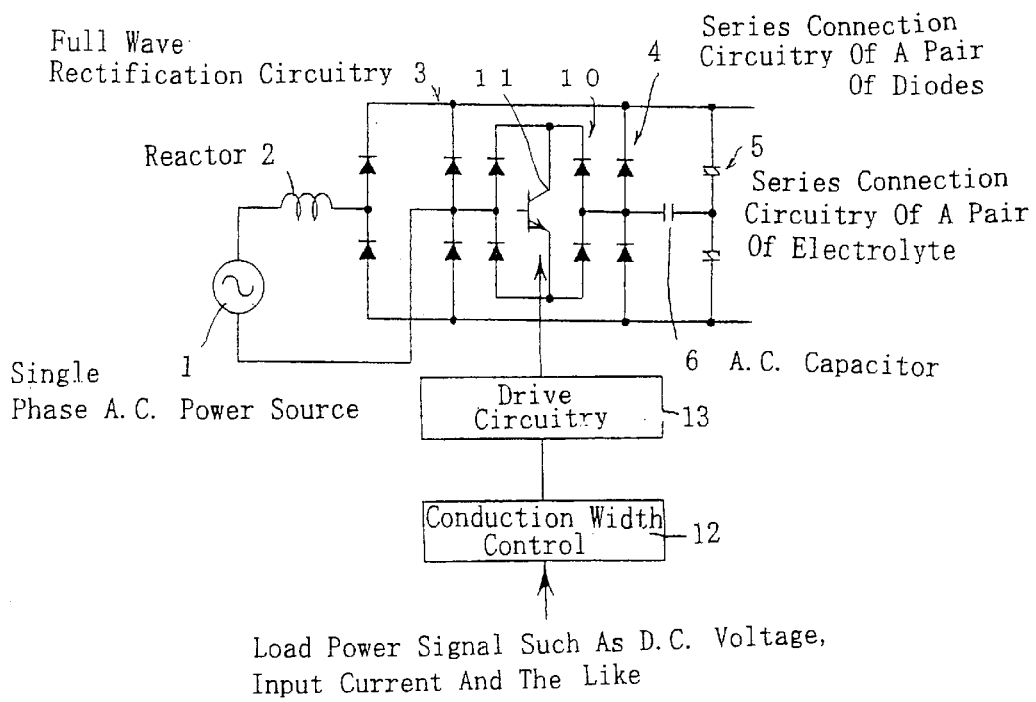
FIG. 60 is an electric diagram illustrating a single phase rectification apparatus of a further embodiment according to the present invention.

FIG. 60 is an electric diagram of a single phase rectification apparatus of a further embodiment according to the present invention.

This single phase rectification apparatus is different from the single phase rectification apparatus illustrated in FIG. 9 in that the center point of the series connection circuitry 4 of the pair of the diodes and one input terminal of the full wave rectification circuitry 3 are connected to one another through a circuitry comprising a diode bridge circuitry 10 and a transistor 11 which is connected its collector-emitter terminals in parallel to the diode bridge circuitry 10, and that a conduction width control section 12 for inputting the signal representing a load power and for performing the conduction width controlling and a drive circuitry 13 for inputting the output signal from the conduction width control section 12 and for supplying a drive signal to the transistor 11 are provided.

When this embodiment is employed, operations and effects which are similar to those of the single phase rectification apparatus illustrated in FIG. 59.

Figure 61:
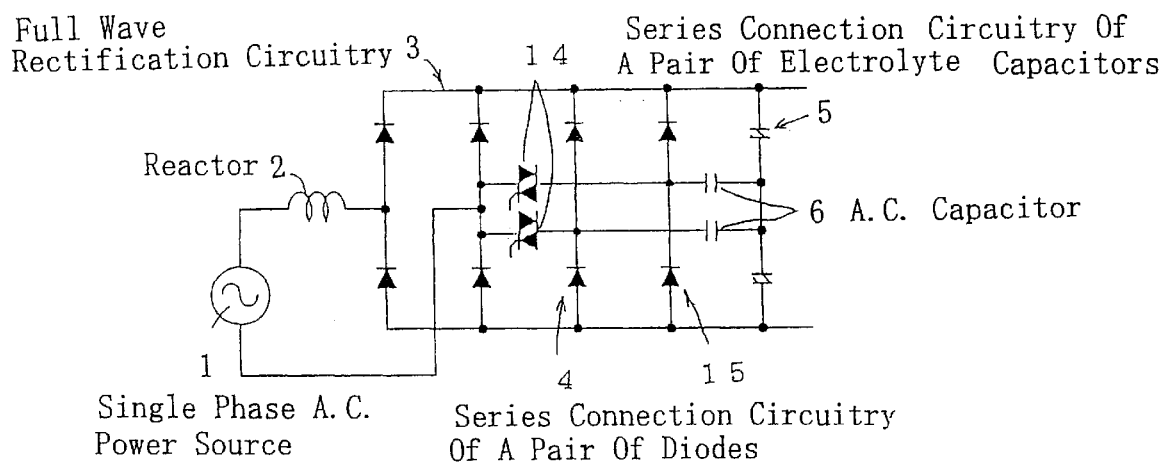
FIG. 61 is an electric diagram illustrating a single phase rectification apparatus of a further embodiment according to the present invention.

FIG. 61 is an electric diagram illustrating a single phase rectification apparatus of a further embodiment according to the present invention.

This single phase rectification apparatus is different from the single phase rectification apparatus illustrated in FIG. 13 in that two series connection circuitry each of a TRIAC 14 and an A.C. capacitor 6 are connected in parallel to one another between one input terminal of the full wave rectification circuitry 3 and the center point of the series connection circuitry 5 of the pair of the smoothing capacitors, that the center point of one TRIAC 14 and one A.C. capacitor 6 and the center point of the series connection circuitry 4 of the pair of the diodes are connected to one another, and that the center point of the other TRIAC 14 and the other A.C. capacitor 6 and the center point of the series connection circuitry 15 of the pair of the diodes are connected to one another.

When this arrangement is employed, the combined capacitance of the both A.C. capacitors 6 can be changed by controlling the both TRIACs 14. As a result, the D.C. voltage can be controlled within a wide power extent. Of course, more than three series connection circuitry can be connected in parallel to one another each series connection circuitry includes the TRIAC 14 and the A.C. capacitor 6. In this case, the D.C. voltage can be controlled within a wider power extent.

Figure 62:
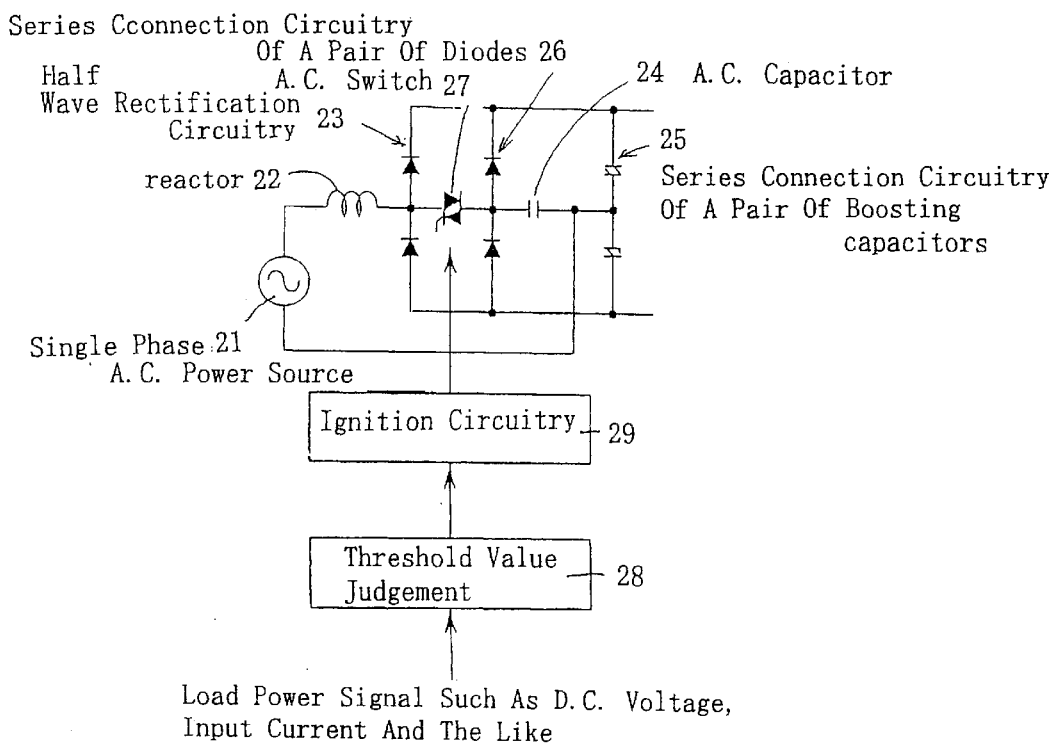
FIG. 62 is an electric diagram illustrating a single phase rectification apparatus of a further embodiment according to the present invention.

FIG. 62 is an electric diagram illustrating a single phase rectification apparatus of a further embodiment according to the present invention.

This single phase rectification apparatus is different from the single phase rectification apparatus illustrated in FIG. 54 in that the center point of the series connection circuitry 26 of the pair of the diodes and the input terminal of the half wave rectification circuitry 23 are connected to one another through a TRIAC 27 which serves the A.C. switch, and that a threshold value judgment section 28 for inputting the signal representing a load power and for comparing the signal with a previously determined threshold value and an ignition circuitry 29 for inputting the output signal from the threshold value judgment section 28 and for supplying an ignition signal to the TRIAC 27 are provided.

Wherein, the threshold value is preferably determined to be a threshold value which corresponds to the output power of 500 W, similarly to the embodiment illustrated in FIG. 54, for example.

When the output power is greater than 500 W, the center point of the series connection circuitry 26 of the pair of the diodes and the input terminal of the half wave rectification circuitry 23 become a short circuit condition so that the above operation is carried out. On the contrary, when the output power is equal to or less than 500 W, the center point of the series connection circuitry 26 of the pair of the diodes and the input terminal of the half wave rectification circuitry 23 become a shut off condition so that only the half wave rectification operation is carried out, consequently the D.C. voltage can be a voltage which is equal to or smaller than the peak value of the power source voltage waveform.

Figure 63:
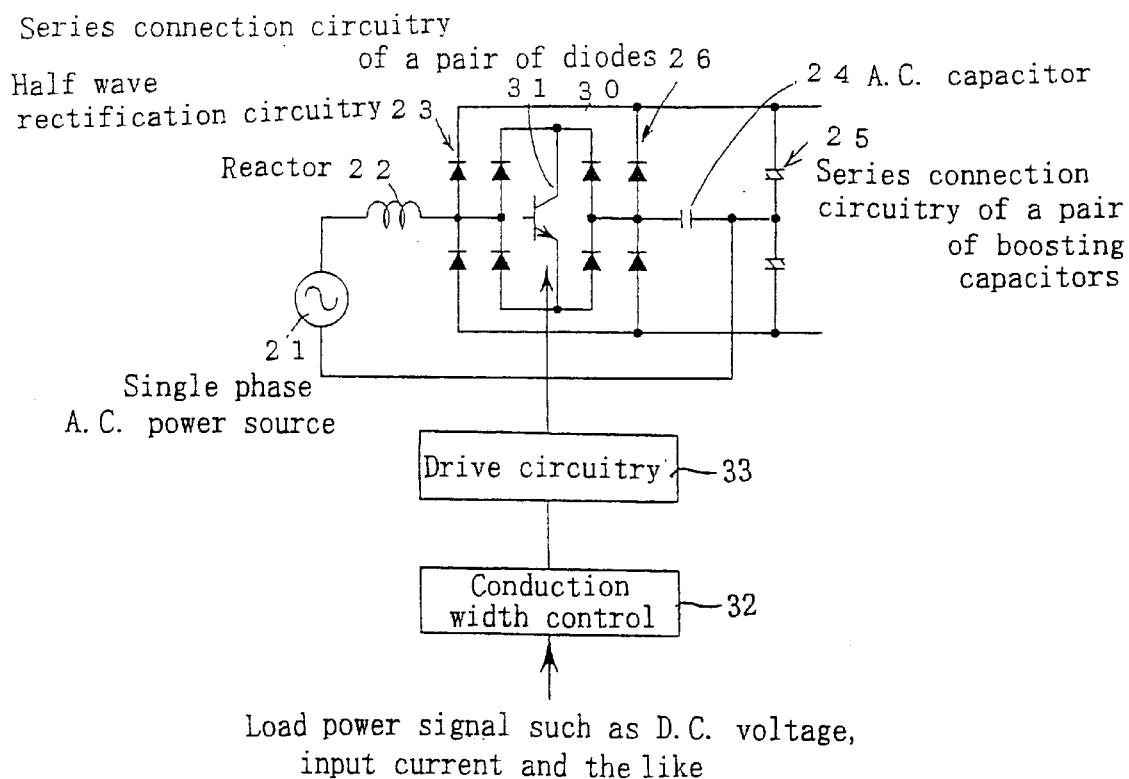
FIG. 63 is an electric diagram illustrating a single phase rectification apparatus of a further embodiment according to the present invention.

FIG. 63 is an electric diagram of a single phase rectification apparatus of a further embodiment according to the present invention.

This single phase rectification apparatus is different from the single phase rectification apparatus illustrated in FIG. 62 in that the center point of the series connection circuitry 26 of the pair of the diodes and the input terminal of the half wave rectification circuitry 23 are connected to one another through a circuitry comprising a diode bridge circuitry 30 and a transistor 31 which is connected its collector-emitter terminals in parallel to the diode bridge circuitry 30, and that a conduction width control section 32 for inputting a signal representing a load power and for performing the conduction width controlling and a drive circuitry 33 for inputting the output signal from the conduction width control section 32 and for supplying a drive signal to the transistor 31.

When this embodiment is employed, operations and effects are realized which are similar to those of the single phase rectification apparatus illustrated in FIG. 62.

Figure 64:
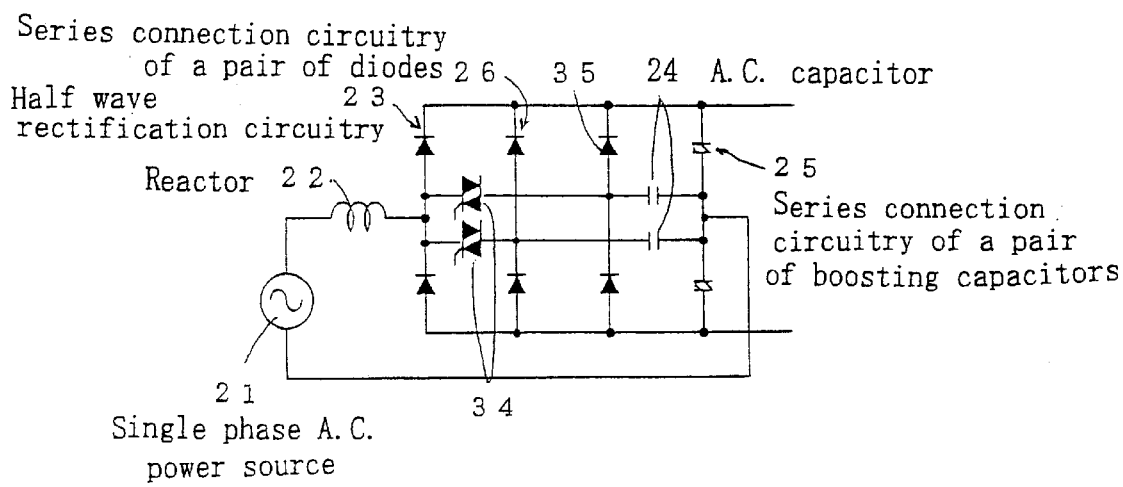
FIG. 64 is an electric diagram illustrating a single phase rectification apparatus of a further embodiment according to the present invention.

FIG. 64 is an electric diagram of a single phase rectification apparatus of a further embodiment according to the present invention.

This single phase rectification apparatus is different from the single phase rectification apparatus illustrated in FIG. 54 in that a series connection circuitry 26 of a pair of diodes and a series connection circuitry 35 of a pair of diodes are connected in parallel to one another between the output terminals of the half wave rectification circuitry 23, that two series connection circuitry each circuitry comprising a TRIAC 34 and an A.C. capacitor 24, are connected in parallel to one another between the input terminal of the half wave rectification circuitry 23 and the center point of the series connection circuitry 25 of the pair of the boosting capacitors, that the center point of one TRIAC 34 and one A.C. capacitor 24 and the center point of the series connection circuitry 26 of the pair of the diodes are connected to one another, and that the center point of the other TRIAC 34 and the other A.C. capacitor 24 and the center point of the series connection circuitry 35 of the pair of the diodes are connected to one another.

When this arrangement is employed, the combined capacitance of the both A.C. capacitors 24 can be controlled by controlling the both TRIACs 34. As a result, the D.C. voltage can be controlled within a wide power extent. Of course, it is possible that more than three series connection circuitry each circuitry comprising the TRIAC 34 and the A.C. capacitor 24, are connected in parallel to one another. In this case, the D.C. voltage can be controlled within a wider power extent.

Figure 65:
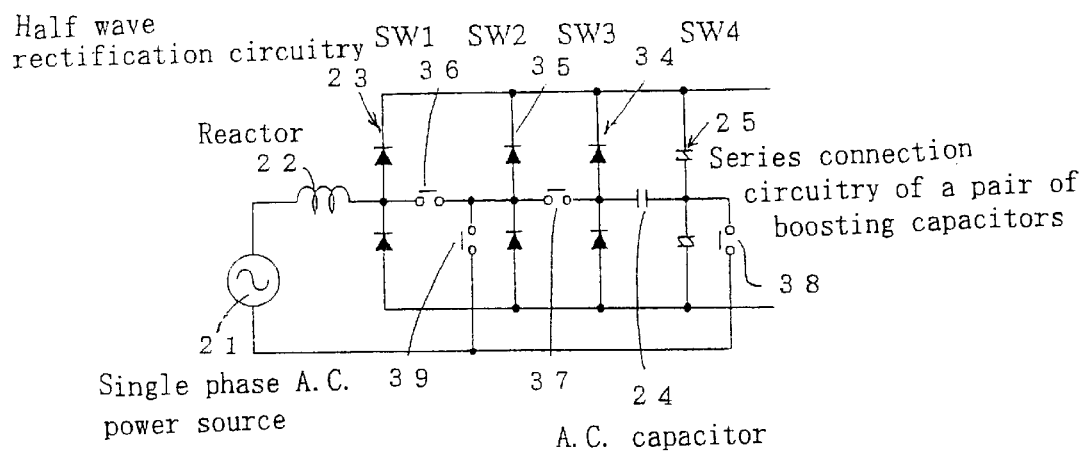
FIG. 65 is an electric diagram illustrating a single phase rectification apparatus of a further embodiment according to the present invention.

FIG. 65 is an electric diagram of a single phase rectification apparatus of a further embodiment according to the resent invention.

In this single phase rectification apparatus, a half wave rectification circuitry 23 and a series connection circuitry 25 of a pair of electrolyte capacitors are connected in parallel to one another, a series connection circuitry 34 of a pair of first diodes is connected in parallel to the series connection circuitry 25 of the pair of the electrolyte capacitors, a series connection circuitry 35 of a pair of second diodes is connected in parallel to the half wave rectification circuitry 23, a second switch 37 is connected between the center point of the series connection circuitry 35 of the pair of the second diodes and the center point of the series connection circuitry 34 of the pair of the first diodes, a first switch 36 is connected between the center point of the series connection circuitry 35 of the pair of the second diodes and the input terminal of the half wave rectification circuitry 23, an A.C. capacitor 24 is connected between the center point of the series connection circuitry 25 of the pair of the electrolyte capacitors and the center point of the series connection circuitry 34 of the pair of the first diodes, one terminal of a single phase A.C. power source 21 is connected to the input terminal of the half wave rectification circuitry 23 through a reactor 22, the other terminal of the single phase A.C. power source 21 is connected to the center point of the series connection circuitry 25 of the pair of the electrolyte capacitors through a third switch 38, and the other terminal of the single phase A.C. power source 21 is connected to the center point of the series connection circuitry 35 of the pair of the second diodes through a fourth switch 39. Further, the first switch 36, the second switch 37, the third switch 38 and the fourth switch 39 are controlled their ON condition and OFF condition, as is illustrated in Table 2, depending upon the condition whether it is a regular condition or a light load condition and depending upon the rectification whether it is the full wave rectification or voltage doubler rectification. Further, in Table 2, the first switch 36 is represented with SW1, the second switch 37 is represented with SW2, the third switch 38 is represented with SW3, and the fourth switch 39 is represented with SW4.

TABLE 2

|  |  | SW1 | SW2 | SW3 | SW4 |
|---|---|---|---|---|---|
| Regular Condition | Full Wave Rectification | OFF | ON | OFF | ON |
|  | Voltage Doubler Rectification | ON | ON | ON | OFF |
| Light Load Condition | Full Wave Rectification | OFF | OFF | OFF | ON |
|  | Voltage Doubler Rectification | ON | OFF | ON | OFF |

This single phase rectification apparatus can be arranged by employing a relay as the A.C. switch, and is preferable for a case that the control such as phase control or the like, at every half cycle of the power source is not carried out. And, the apparatus can selectively carry out the full wave rectification operation and the voltage doubler rectification operation, and the apparatus can cope with the regular condition and the light load condition by controlling ON, OFF condition of the first switch 36, the second switch 37, the third switch 38 and the fourth switch 39, as are illustrated in Table 2.

As a result, the apparatus supplies the stable D.C. voltage despite the power source voltage by carrying out the full wave rectification operation for the single phase 200V power source and by carrying out the voltage doubler rectification operation for the single phase 100V power source, for example. In other words, the single phase rectification apparatus can be present which is applicable to the single phase 100V power source and the single phase 200V power source.

Further, arrangements other than the arrangement illustrated in FIG. 65 can be employed as the single phase rectification apparatus for coping with different power sources which arrangements are sufficient to selectively carrying out the full wave rectification operation and the voltage doubler rectification operation.

Figure 66:
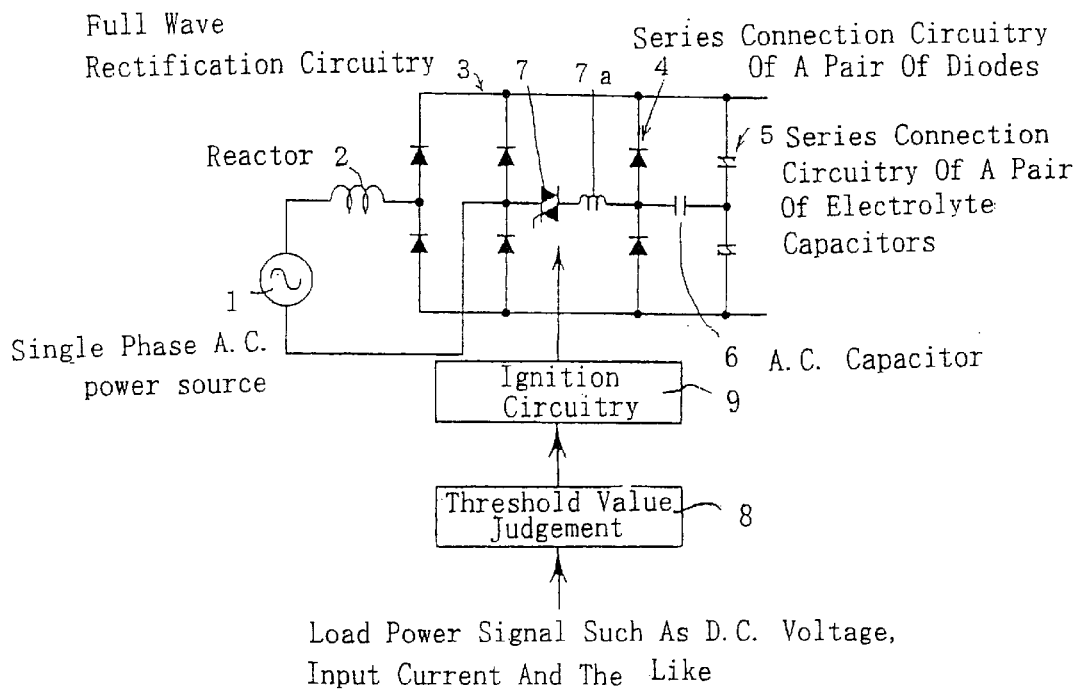
FIG. 66 is an electric diagram illustrating a single phase rectification apparatus of a further embodiment according to the present invention.

FIG. 66 is an electric diagram of a single phase rectification apparatus of a further embodiment according to the present invention.

This single phase rectification apparatus is different from the single phase rectification apparatus illustrated in FIG. 59 in that the center point of the series connection circuitry 4 of the pair of the diodes and one input terminal of the full wave rectification circuitry 3 are connected to one another through an A.C. switch comprising a TRIAC 7 and an inductor 7a instead the A.C. switch comprising only the TRIAC 7.

Operations and effects of this embodiment is as follows.

When the center point of the series connection circuitry 4 of the pair of the diodes and the center point of the series connection circuitry 5 of the pair of the electrolyte capacitors are connected to one another through only the TRIAC 7, the residual current of the TRIAC 7 after the mode has changed from the TRIAC 7 to the diode, because a current which is obtained by dividing the current just prior to the mode change based upon the impedance ratio of the electrolyte capacitor and the A.C. capacitor 6. When the residual current of the TRIAC 7 is equal to or smaller than the minimum current (holding current) of the TRIAC 7, the TRIAC 7 can be shut off. But, when the load current is great, the TRIAC 7 cannot be shut off during a half cycle of the power source so that a disadvantage arises in that characteristics such as power factor, D.C. voltage and the like become discontinuous depending upon the load current.

When the arrangement illustrated in FIG. 66 is employed, the TRIAC 7 is securely shut off by the following operations.

Figure 67A:
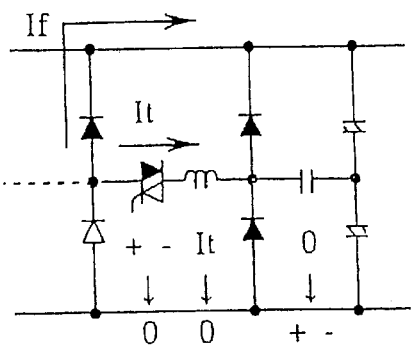
FIGS. 67A and 67B are electric diagrams useful in understanding the effect of an inductor which is connected in series to a TRIAC.
Figure 67B:
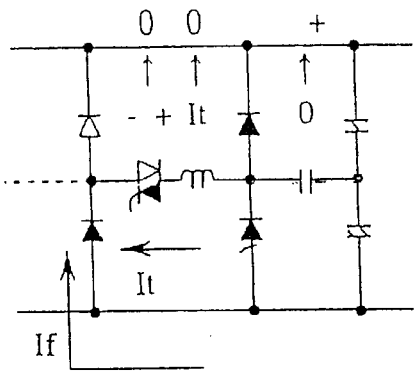

When the transition period for the mode change from the A.C. switch to the diode, there is an interval when both the diode current If and the TRIAC current It flow, as are illustrated in FIGS. 67(A) and 67(B). During the interval, when the inductance of the inductor 7a is supposed to be L, the conduction current of the inductor 7a is supposed to be I, the capacitance of the A.C. capacitor 6 is supposed to be C, and the voltage between the terminals of the A.C. capacitor 6 is supposed to be V, the initial accumulation energy $LI^2/2$ of the inductor 7a serially connected to the TRIAC 7 moves to the A.C. capacitor 6 by the LC resonance as the energy $CV^2/2$, and when the most current has moved to the diode, the voltage of the A.C. capacitor 6 is raised. Wherein, the voltages of the TRIAC 7, inductor 7a and the A.C. capacitor 6 are constrained by the electrolyte capacitor and diode so that a reverse bias voltage is applied to the TRIAC 7, consequently the TRIAC 7 is securely shut off.

Further, operations and effects are realized which are similar to those of the single phase rectification apparatus illustrated in FIG. 59.

Figure 68:
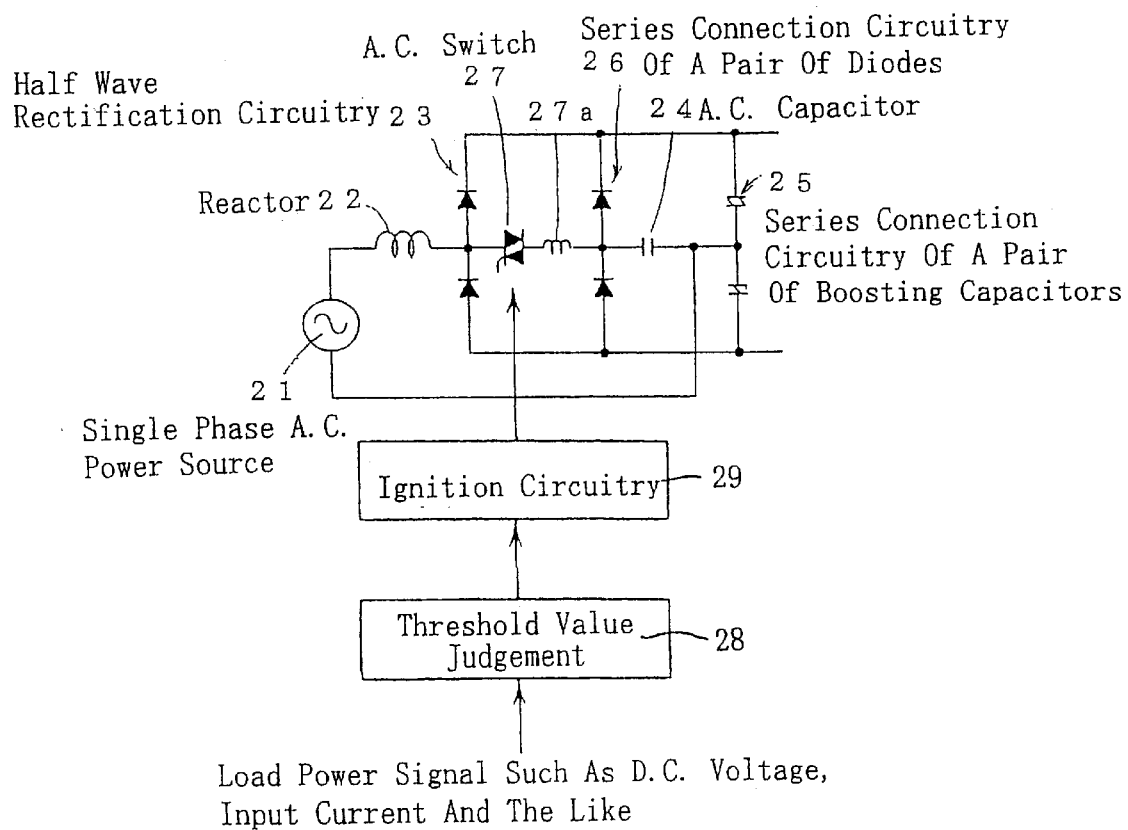
FIG. 68 is an electric diagram illustrating a single phase rectification apparatus of a further embodiment according to the present invention.

FIG. 68 is an electric diagram of a single phase rectification apparatus of a further embodiment according to the present invention.

This single phase rectification apparatus is different from the single phase rectification apparatus illustrated in FIG. 62 in that the center point of the series connection circuitry 26 of the pair of the diodes and the input terminal of the half wave rectification circuitry 23 are connected to one another through an A.C. switch comprising a TRIAC 27 and an inductor 27a instead the A.C. switch comprising only the TRIAC 27.

When this embodiment is employed, the TRIAC 27 can securely be shut off similarly to that of the embodiment illustrated in FIG. 66, even when the load current is great. Also, operations and effects are realized which are similar to those of the embodiment illustrated in FIG. 62.

Industrial applicability

The present invention is a suitable power source apparatus for an air conditioner, a lighting device or the like.

What is claimed is:

1. A single phase rectification apparatus which connects a full wave rectification circuitry (3) to a single phase A.C. power source (1) through a reactor (2), connects a pair of smoothing capacitors between the output terminals of the full wave rectification circuitry (3), the smoothing capacitors being connected in series to one another, connects a pair of diodes (4) connected in series to one another in parallel to series connection circuitry (5) of the pair of smoothing capacitors, connects the central point of the pair of the diodes (4) and the center point of the pair of smoothing capacitors (5) through an A.C. switch (7) which operates to shut off both central points when load is light, and connects an A.C. capacitor (6) between the one input terminal of the full wave rectification circuitry (3) and the center point of the pair of the smoothing capacitors (5).

2. A single phase rectification apparatus as set forth in claim 1, wherein the center point of the pair of diodes (4) and the center point of the pair of the smoothing capacitors (5) are connected to one another through an A.C. switch (7) which is controlled its ignition angle using phase controlling.

3. A single phase rectification apparatus as set forth in claim 1, wherein the center point of the pair of the diodes (4) and the center point of the smoothing capacitors (5) are connected to one another through an A.C. switch (10) (11) which is made of a self arc extinguishing element for controlling a conduction angle.

4. A single phase rectification apparatus as set forth in claim 1, wherein the center point of the pair of the diodes (4) and the center point of the pair of the smoothing capacitors (5) are connected to one another through a serial connection circuitry of an inductor and an A.C. switch (10) (11) which is controlled its ignition angle using phase controlling.

5. A single phase rectification apparatus as set forth in claim 1, wherein the center point of the pair of the diodes (4) and the center point of the smoothing capacitors (5) are connected to one another through an A.C. switch (10) (11) which is made of a self arc extinguishing element for controlling a conduction phase.

6. A single phase rectification apparatus which connects a parallel connection circuitry of a half wave rectification circuitry (23) and a pair of boosting capacitors (25) connected in series to one another to a single phase A.C. power source (21) through a reactor (22), connects a pair of diodes (26) in series to one another to the series connection circuitry of the pair of the boosting capacitors (25) in parallel, connects the center point of the pair of the diodes (26) and the center point of the pair of the boosting capacitors (25) to one another through an A.C. switch (27) which operates to shut off both central points when load is light, and connects an A.C. capacitor (24) between an input terminal of the half wave rectification circuitry (23) and the center point of the pair of the boosting capacitors (25).

7. A single phase rectification apparatus as set forth in claim 6, wherein an A.C. switch (27) is connected between the center point of the boosting capacitors (25) and the center point of the pair of the diodes (26), the A.C. switch (27) being controlled its ignition angle using phase controlling.

8. A single phase rectification apparatus as set forth in claim 6, wherein an A.C. switch (30) (31) is connected between the center point of the boosting capacitors (25) and the center point of the pair of the diodes (26), the A.C. switch (30) (31) being made of a self arc extinguishing element for controlling a conduction angle.

9. A single phase rectification apparatus as set forth in claim 6, wherein a series connection circuitry of an A.C. switch (30) (31) and an inductor is connected between the center point of the boosting capacitors (25) and the center point of the pair of the diodes (26), the A.C. switch (30) (31) being controlled its ignition angle using phase controlling.

10. A single phase rectification apparatus as set forth in claim 6, wherein an A.C. switch (30) (31) is connected between the center point of the boosting capacitors (25) and the center point of the pair of the diodes (26), the A.C. switch (30) (31) being made of a self arc extinguishing element for controlling a conduction phase.

11. A single phase rectification apparatus which connects a full wave rectification circuitry (23) (35) to a single phase A.C. power source (21) through a reactor (22), connects a series connection circuitry of a pair of smoothing capacitors (25) between output terminals of the full wave rectification circuitry (23) (35), connects a series connection circuitry of a pair of diodes (34) in parallel to the series connection circuitry of the pair of the smoothing capacitors (25), connects an A.C. capacitor (24) between the center point of the series connection circuitry of the pair of the diodes (34) and one input terminal of the full wave rectification circuitry (23) (35), and includes a switch (36) (37) (38) (39) for selectively carrying out full wave rectification operation and voltage doubler rectification operation.

12. A single phase rectification apparatus which connects a parallel connection circuitry of a half wave rectification circuitry (23) and a pair of smoothing capacitors (25) connected in series to one another to a single phase A.C. power source (21) through a reactor (22), connects a series connection circuitry of a pair of first diodes (34) in parallel to the series connection circuitry of the pair of the smoothing capacitors (25), connects a series connection circuitry of a pair of second diodes (35) in parallel to the half wave rectification circuitry (23), connects an A.C. capacitor (24) between the center point of the pair of the second diodes (35) and the center point of the pair of the first diodes (34), connects a first switch (36) between the center point of the pair of the second diodes (35) and the input terminal of the half wave rectification circuitry (23), connects a second switch (37) between the center point of the pair of the smoothing capacitors (25) and the center point of the first diodes (34), connects a terminal among the series connection circuitry of the single phase A.C. power source (21) and the reactor (22) which terminal is not connected to the input terminal of the half wave rectification circuitry (23), to the center point of the pair of the smoothing capacitors (25) through a third switch (38) which operates in linkage with the first switch (36), and connects the terminal to the center point of the pair of the second diodes (35) through a fourth switch (39).

13. A single phase rectification apparatus which connects a full wave rectification circuitry (3) to an A.C. power source (1) through a reactor (2), connects a series connection circuitry of a pair of smoothing capacitors between the output terminals of the full wave rectification circuitry (3), connects a series connection circuitry of a pair of diodes (4) in parallel to the series connection circuitry (5) of the pair of the smoothing capacitors, connects the center point of the pair of the diodes (4) and the center point of the pair of the smoothing capacitors (5) to one another through an A.C. capacitor (6), and connects an A.C. switch (7) between one input terminal of the full wave rectification circuitry (3) and the center point of the pair of the smoothing diodes (5), which A.C. switch (7) operates a shut off operation condition when load is light.

14. A single phase rectification apparatus as set forth in claim 13, wherein the one input terminal of the full wave rectification circuitry (3) and the center point of the pair of the smoothing capacitors (5) are connected to one another through an A.C. switch (7) which is controlled its ignition angle by phase controlling.

15. A single phase rectification circuitry as set forth in claim 13, wherein the one input terminal of the full wave rectification circuitry (3) and the center point of the pair of the smoothing capacitors (5) are connected to one another through an A.C. switch (7) which is made of a self arc extinguishing element for controlling a conduction angle.

16. A single phase rectification apparatus as set forth in claim 13, wherein the one input terminal of the full wave rectification circuitry (3) and the center point of the pair of the smoothing capacitors (5) are connected to one another through a series connection circuitry of an inductor and an A.C. switch (10) (11) which is controlled its ignition angle using phase controlling.

17. A single phase rectification apparatus as set forth in claim 13, wherein the one input terminal of the full wave rectification circuitry (3) and the center point of the pair of the smoothing capacitors (5) are connected to one another through an A.C. switch (10) (11) which is made of a self arc extinguishing element for controlling a conduction phase.

18. A single phase rectification apparatus which connects a parallel connection circuitry of a half wave rectification circuitry (23) and a pair of boosting capacitors (25) connected in series to one another to a single phase A.C. power source (21) through a reactor (22), connects a series connection circuitry of a pair of diodes (26) in parallel to the series connection circuitry of the pair of the boosting capacitors (25), connects the center point of the pair of the diodes (26) and the center point of the pair of the boosting capacitors (25) to one another through an A.C. capacitor (24), and connects an A.C. switch (27) between the input terminal of the half wave rectification circuitry (23) and the center point of the pair of the boosting capacitors (25) which A.C. switch (27) operates in a shut off operation condition when load is light.

19. A single phase rectification apparatus as set forth in claim 18, wherein an A.C. switch (27) is connected between the input terminal of the half wave rectification circuitry (23) and the center point of the pair of the boosting capacitors (25) which A.C. switch (27) is controlled its ignition angle using phase controlling.

20. A single phase rectification apparatus as set forth in claim 18, wherein an A.C. switch (30) (31) is connected between the input terminal of the half wave rectification circuitry (23) and the center point of the pair of the boosting capacitors (25) which A.C. switch (30) (31) is made of self arc extinguishing element for controlling a conduction angle.

21. A single phase rectification apparatus as set forth in claim 18, wherein a series connection circuitry of an A.C. switch (30) (31) and an inductor is connected between the input terminal of the half wave rectification circuitry (23) and the center point of the pair of the boosting capacitors (25) which A.C. switch (30) (31) is controlled its ignition phase using phase controlling.

22. A single phase rectification apparatus as set forth in claim 18, wherein an A.C. switch (30) (31) is connected between the input terminal of the half wave rectification circuitry (23) and the center point of the pair of the boosting capacitors (25) which A.C. switch (30) (31) is made of self arc extinguishing element for controlling a conduction phase.

23. A single phase rectification apparatus which connects a full wave rectification circuitry (23) (35) to a single phase A.C. power source (21) through a reactor (22), connects a series connection circuitry of a pair of smoothing capacitors (25) between the output terminals of the full wave rectification circuitry (23) (35), connects a series connection circuitry of a pair of diodes (34) in parallel to the series connection circuitry of the pair of the smoothing capacitors (25), connects an A.C. capacitor (24) between the center point of the series connection circuitry of the pair of the diodes (34) and the center point of the series connection circuitry of the pair of the smoothing capacitors (25), and includes a switch (36) (37) (38) (39) for selectively carrying full wave rectification operation and voltage doubler rectification operation.

24. A single phase rectification apparatus which connects a parallel connection circuitry of a half wave rectification circuitry (23) and a pair of smoothing capacitors (25) connected in series to one another to a single phase A.C. power source (21) through a reactor (22), connects a series connection circuitry of a pair of first diodes (34) connected in series to one another in parallel to the series connection circuitry of the pair of the smoothing capacitors (25), connects a series connection circuitry of a pair of second diodes (35) in parallel to the half wave rectification circuitry (23), connects a second switch (37) between the center point of the pair of the second diodes (35) and the center point of the pair of the first diodes (34), connects a first switch (36) between the center point of the pair of the second diodes (35) and the input terminal of the half wave rectification circuitry (23), connects an A.C. capacitor (24) between the center point of the pair of the smoothing capacitors (25) and the center point of the pair of the first diodes (34), connects a terminal among the series connection circuitry of the single phase A.C. power source (21) and the reactor (22) which terminal is on a side which is not connected to the input terminal of the half wave rectification circuitry (23), to the center point of the pair of the smoothing capacitors (25) through a third switch (38) which operates in linkage with the first switch (36), and connects the terminal to the center point of the pair of the second diodes (35) through a fourth switch (39).

* * * * *